(12) United States Patent
Reitano et al.

(10) Patent No.: US 11,339,578 B2
(45) Date of Patent: May 24, 2022

(54) DEVICE FOR CLAMPING A PIECE OF FORMWORK, FORMWORK FOR MAKING A CONCRETE SLAB, AND A METHOD OF MAKING A CONCRETE SLAB

(71) Applicant: Form Jig Pty Ltd., Bowral (AU)

(72) Inventors: John Reitano, Fairfield West (AU); Siegfried Mehl, Kings Langley (AU)

(73) Assignee: FORM JIG PTY LTD., Bowral (AU)

( * ) Notice: Subject to any disclaimer, the term of this patent is extended or adjusted under 35 U.S.C. 154(b) by 1260 days.

(21) Appl. No.: 15/760,392

(22) PCT Filed: Sep. 16, 2015

(86) PCT No.: PCT/AU2015/050554
§ 371 (c)(1),
(2) Date: Mar. 15, 2018

(87) PCT Pub. No.: WO2016/041015
PCT Pub. Date: Mar. 24, 2016

(65) Prior Publication Data
US 2018/0258655 A1 Sep. 13, 2018

(30) Foreign Application Priority Data
Sep. 16, 2014 (AU) ................................ 2014903688

(51) Int. Cl.
*E04G 17/14* (2006.01)
*B25B 5/00* (2006.01)
*B25B 5/10* (2006.01)
*F16B 2/12* (2006.01)

(52) U.S. Cl.
CPC .............. *E04G 17/14* (2013.01); *B25B 5/003* (2013.01); *B25B 5/006* (2013.01); *B25B 5/102* (2013.01); *F16B 2/12* (2013.01)

(58) Field of Classification Search
CPC ......... E04G 17/14; B25B 5/003; B25B 5/006; B25B 5/102; B25B 5/02; B25B 5/085; F16B 2/12
USPC ................................ 269/45, 43, 95, 166, 165
See application file for complete search history.

(56) References Cited

U.S. PATENT DOCUMENTS

| | | | |
|---|---|---|---|
| 979,305 A | * | 12/1910 | Hunt .......................... B25B 1/20 269/9 |
| 2,729,252 A | | 1/1956 | Elliot |
| 5,975,483 A | | 11/1999 | Schuele |
| 7,530,556 B1 | | 5/2009 | Zheng |

FOREIGN PATENT DOCUMENTS

| | | | | |
|---|---|---|---|---|
| EP | 1887164 B1 | 12/2009 | | |
| WO | WO-2013085398 A1 | * | 6/2013 | ............. E04G 17/14 |

* cited by examiner

*Primary Examiner* — Tyrone V Hall, Jr.
*Assistant Examiner* — Abbie E Quann
(74) *Attorney, Agent, or Firm* — Craft Chu PLLC; Andrew W. Chu

(57) ABSTRACT

A device for clamping a piece of formwork includes a bar having an end for attachment to a body. The device includes a jaw mounted on the bar and for receiving the piece of formwork, the jaw being movable along the bar.

6 Claims, 19 Drawing Sheets

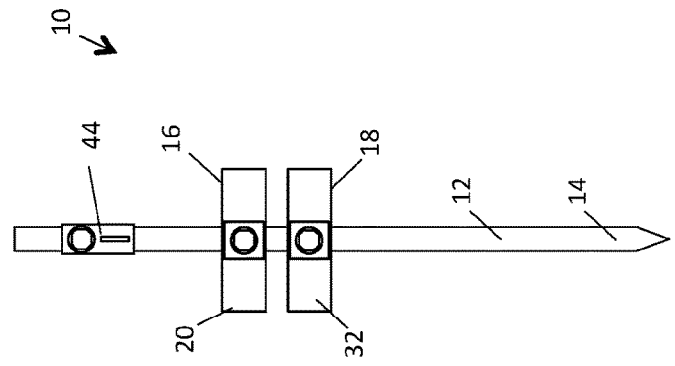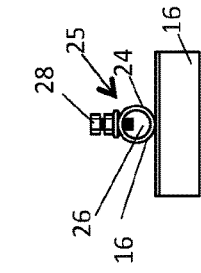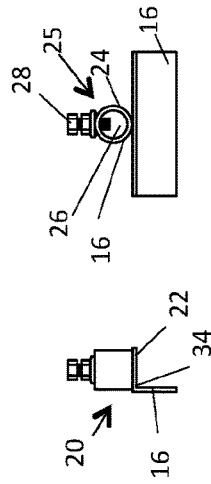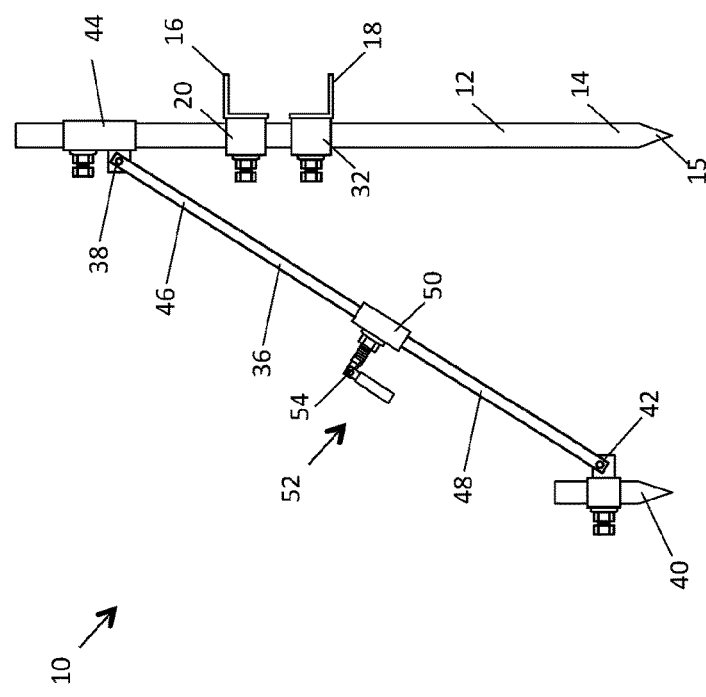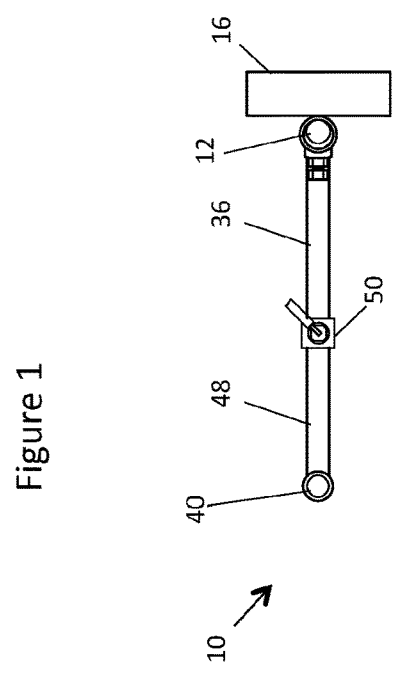

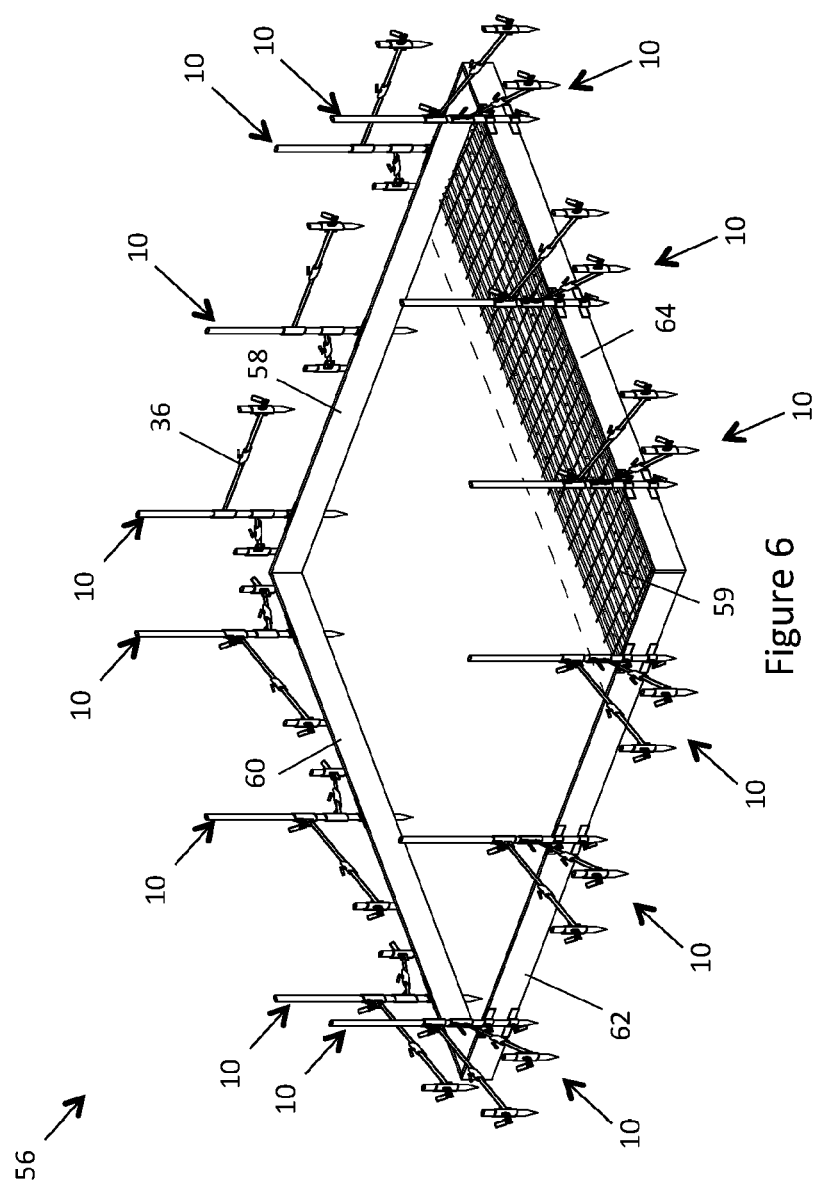

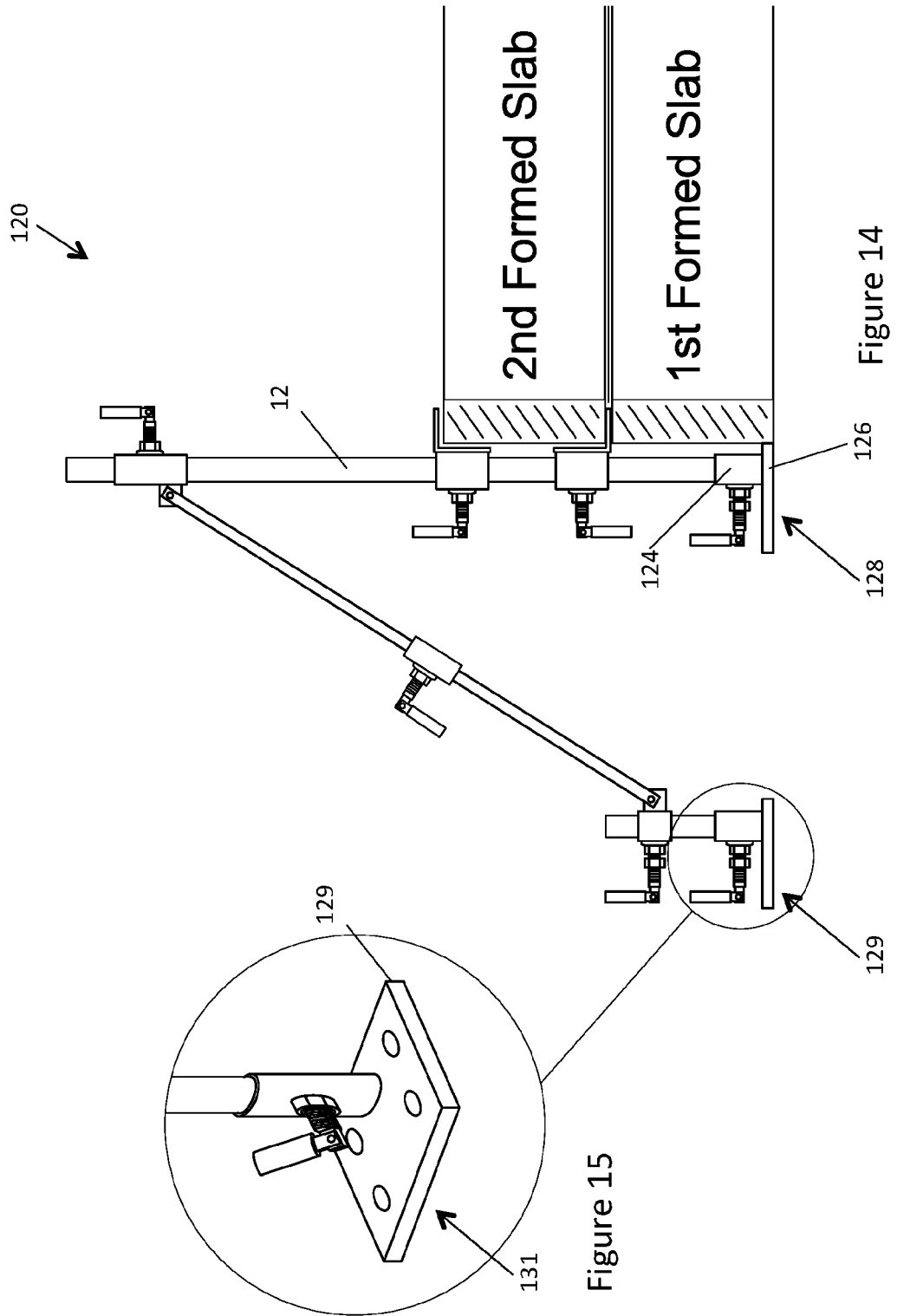

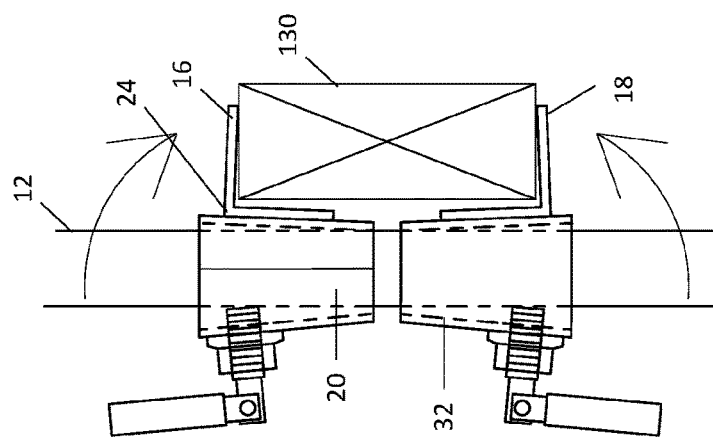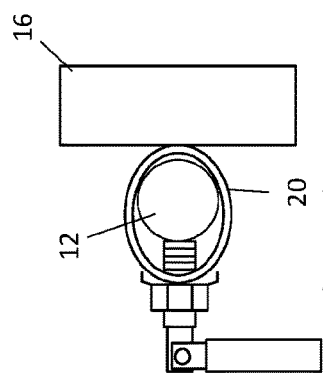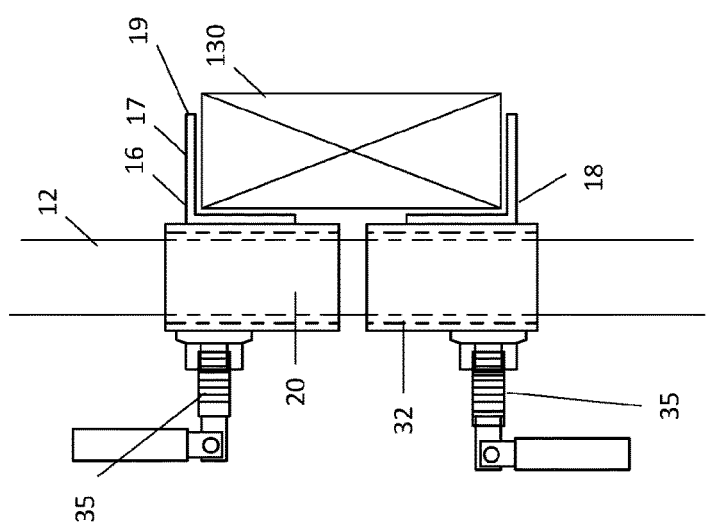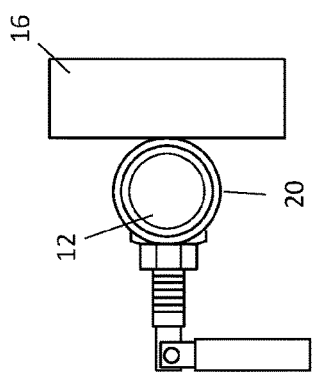

DEVICE FOR CLAMPING A PIECE OF FORMWORK, FORMWORK FOR MAKING A CONCRETE SLAB, AND A METHOD OF MAKING A CONCRETE SLAB

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The disclosure herein generally relates to devices, systems, and methods for forming formwork, and particularly but not exclusively to a device for clamping a piece of formwork, formwork for making a concrete slab, and a method of making a concrete slab.

2. Description of Related Art Including Information Disclosed Under 37 CFR 1.97 and 37 CFR 1.98

The laying of ground level concrete structures is ubiquitous and is a significant component of the building and construction industries worldwide. Examples of ground level concrete structures include kerb, gutters, paths, house and industrial slabs and tilt slabs.

The making of a concrete slab generally requires the construction of formwork which is a mould into which concrete is poured and allowed to set. Formwork may be made of timber, for example. The formwork may be built on site out of timber and plywood or moisture-resistant particleboard. Lengths of timber may be nailed, for example, to wooden stakes or pegs that are driven into ground.

Generally, for all but the simplest of slabs a formwork carpenter is required for making the formwork. After the concrete is poured and stiff enough, the nails and timber may be removed. The timber lengths, stakes and pegs, are damaged by the penetration of nails and hammering or during the process of their removal. Damage to around 25% of the timber is common. The lengths of timber may subsequently be taken up, leaving the finished slab, by a second team that arrives a day later. The timber lengths may need to be cut to size.

While timber formwork may be highly flexible, it may require significant amounts of labour for its construction. Furthermore, a person or persons with the relatively high level of skills to form the formwork, for example a formwork carpenter, may be required on site prior to the arrival of another person or persons with the concrete pouring skills. Requiring two teams to lay a concrete slab is common but may be considered to be inefficient and time-consuming.

The formwork carpenter is generally the highest paid tradesman on a site, typically being paid twice as much. Good formwork carpenters are difficult to find. It is common for a formwork carpenter to be poached from a site because of the lack of formwork carpenters, which is a major project disruption because laying slabs, for example, are on the critical project path.

Some other problems faced by form-workers include:
A highly volatile industry
The form-work business is effectively a labour hire business—if there is no work, then there is no ability to pay workers
Workplace occupational health and safety problems with nails, saws, etc.
Lack of skilled carpenters

BRIEF SUMMARY OF THE INVENTION

Disclosed herein is a device for clamping a piece of formwork. The device comprises a bar having an end for attachment to a body. The device comprises a jaw mounted on the bar and for receiving the piece of formwork, the jaw being movable along the bar.

Embodiments of the device may enable a person other than a carpenter, for example a concrete pourer, to make formwork. The number of teams required to lay a concrete slab may be reduced to one. The formwork may be rapidly assembled and disassembled without the insertion and subsequent removal of nails and/or screws, which may take time and damage the formwork. The formwork may be free of nails that may otherwise protrude therefrom, presenting a danger to workers. In an embodiment, the jaw has a first mode and a second mode, wherein in the first mode the jaw is movable along the bar, and in the second mode the jaw is immovable along the bar. The jaw may comprise a releasable clamp that in the second mode is clamped to the bar and in the first mode is not clamped to the bar. The releasable clamp may comprise a releasable clamp body defining a bar receiving passage configured for receiving the bar and a threaded passage for holding a screw operable to penetrate the bar receiving passage. The bar receiving passage may have a first opening and a second opening and the threaded passage may be closer to one of the first opening and the second opening. The releasable clamp may be configured to torque when the mode is changed between the first mode and the second mode for gripping the piece of formwork. The threaded passage may be opposite the jaw. In an embodiment, the jaw may comprise an inner corner for receiving an edge of the piece of formwork. In an embodiment, the bar has a thread, and a nut engaged with the thread and operable to abut the first jaw. The bar may have another nut engaged with the thread and operable to abut the second jaw.

An embodiment comprises another jaw mounted on the bar and for receiving the piece of formwork. The other jaw may be movable along the bar. The other jaw may have a first mode and a second mode, wherein in the first mode the other jaw is movable along the bar, and in the second mode the other jaw is immovable along the bar. The other jaw may have at least some or all of the features of the first jaw described herein.

In an embodiment, the bar comprises a rod having a circular cross section. In an embodiment, the end is for driving into a body. The end may comprise a spike for driving into the body. The end may comprise a plurality of body engaging wings. The plurality of body engaging wings may form a cross. The plurality of body engaging wings may strengthen the engagement of the end with body, for example when the body comprises earth or the ground.

In an embodiment, attached at the end is an attachment element for attachment to a body. The attachment element may have formed therein at least one aperture for at least one fastener. The attachment element may have a bottom perpendicular to the bar. The bottom may be for contacting the body. The attachment element may be separable from the bar. The attachment element may be inseparable from the bar.

An embodiment comprises a prop coupled to the bar. The prop may comprise a distal spike for driving into ground. The distal spike may be pivotable around a distal joint. The prop may comprise a plurality of body engaging wings adjacent the distal spike.

In an embodiment, attached to a distal end of the prop is a distal attachment element for attachment to the body. The distal attachment element may have formed therein at least one aperture for at least one fastener. The distal attachment element may have a bottom perpendicular to the bar. The may be being for contacting the body. The distal attachment element may be separable from the bar. The distal attachment element may alternatively be inseparable from the bar. The prop may be pivotally coupled to the bar. The prop may be coupled to the bar by a releasable prop clamp that when released is movable along the bar. The prop may have a length adjustment mechanism. The length adjustment mechanism may comprise a telescopic length adjustment mechanism. The length adjustment mechanism may have an operable mode and a non-operable mode. The prop may comprise a locking mechanism that when operated switches the length adjustment mechanism between the operable mode and the non-operable mode.

An embodiment comprises a spar configured for connecting to another device for clamping a piece of formwork. In an embodiment, the jaw comprises a moulding element for forming a rebate in a concrete slab made using the piece of formwork.

In an embodiment, the plurality of wings form a cross.

Disclosed herein is formwork for making a concrete slab. The formwork comprises a plurality of devices for clamping a piece of formwork each defined in accordance with the above disclosure. The formwork comprises a plurality of formwork parts clamped by the plurality of devices.

In an embodiment, the end of each of the plurality of devices is driven into the body.

Alternatively, the attachment element is fastened to the body.

In an embodiment, the spar of one of the plurality of devices for clamping a piece of formwork is connected to another one of the plurality of devices for clamping a piece of formwork. Disclosed herein is a device for clamping a piece of formwork, the device comprising:
 a bar having an end for attachment to a body;
 a jaw and another jaw mounted on the bar and for receiving the piece of formwork, the jaw and the other jaw being movable along the bar, wherein the jaw has a lever operably coupled to a pull bar, the pull bar having an end configured to engage the other jaw. Disclosed herein is a method of making a concrete slab. The method comprises the step of attaching to a body the end of each of a plurality of devices for clamping a piece of formwork in accordance with the above disclosure. The method comprises making formwork by clamping the plurality of devices to a plurality of formwork parts. The method comprises disposing concrete in the formwork. An embodiment comprises the step of setting the concrete to form a concrete slab.

An embodiment comprises the step of moving the jaw and the other jaw of each of the plurality of devices for clamping a piece of formwork along each respective bar. The step of moving the jaw and the other jaw of each of the plurality of devices may comprise the step of moving the jaw and the other jaw of each of the plurality of devices upward along each respective bar. Both the jaw and the other jaw may be moved upward. Moving the jaw and the other jaw of each of the plurality of devices for clamping a piece of formwork may be to lift the plurality of formwork parts.

An embodiment comprises the step of disposing further concrete in the formwork after moving the jaw and the other jaw of each of the plurality of devices along each respective bar. The step of dispensing concrete may comprise the step of laying a sheet on the concrete so disposed. The further concrete may be set to form a further slab. The method may be a method for forming a plurality of concrete slabs.

An embodiment comprises the step of driving into the body the end of each of the plurality of devices.

An embodiment comprises the step of fastening the attachment element of each of the plurality of devices to the body.

An embodiment comprises the step of adjusting the length of the prop of at least one of the plurality of devices. An embodiment comprises the step of switching the length adjustment mechanism of the prop of at least one of the plurality of devices between the operable mode and the non-operable mode.

An embodiment comprises the step of disposing concrete reinforcing material in the formwork.

An embodiment comprises the step of removing the formwork.

An embodiment comprises the step of unclamping the plurality of devices from the plurality of formwork parts.

An embodiment comprises the step of removing the plurality of devices from the body.

An embodiment comprises the step of connecting two of the plurality of devices with a spar.

An embodiment comprises the step of changing the mode of the jaw of each of the plurality of devices from the first mode to the second mode. The step of changing the mode of the jaw of each of the plurality of devices may comprise the jaw of each of the plurality of devices torqueing into the plurality of formwork parts. Changing the mode of the jaw of each of the plurality of devices from the first mode to the second mode may deform the releasable clamp body of the jaw of each of the plurality of devices causing the jaw of each of the plurality of devices to torque into the plurality of formwork parts. An embodiment comprises the step of changing the mode of the other jaw of each of the plurality of devices from the first mode to the second mode. The step of changing the mode of the other jaw of each of the plurality of devices may comprise the step of the other jaw of each of the plurality of devices torqueing into the plurality of formwork parts. Changing the mode of the other jaw from the first mode to the second mode may deform the releasable clamp body of the other jaw of each of the plurality of devices causing the other jaw of each of the plurality of deformable devices to torque into the plurality of formwork parts.

An embodiment comprises an adjustable arm for clamping another piece of formwork. The adjustable arm may comprise an elbow. The elbow may be fixed. Alternatively, the elbow may be adjustable. The adjustable arm may have a distal end laterally displaced from the bar.

Attached to the adjustable arm may be a jaw for receiving another piece of formwork. A clamp may attach the adjustable arm to the bar. The clamp may define another bar receiving passage configured for receiving the bar. The other bar receiving passage may be configured to slidingly receive the bar. The other bar receiving passage may be configured for the bar to be rotatable therein. The clamp may define an arm receiving passage configured to receive the adjustable arm. The arm receiving passage may be configured to slidingly receive the adjustable arm. The arm receiving passage may be configured for the adjustable arm to be rotatable therein. The clamp may have a joint for adjusting the relative orientations of the arm receiving passage and the other bar receiving passage. Disclosed herein is a spreader for defining the separation of a first piece of formwork and a second piece of formwork, the spreader comprising:
 a first formwork engager at a first end and a second formwork engager at a second end; a collapsible spar spacing apart the first formwork engager and the second formwork engager; and
 a releasable clamp configured to prevent collapse of the collapsible spar.

Disclosed herein is a method for defining the separation of a first piece of formwork and a second piece of formwork.

Disclosed herein is a joining bracket for joining adjacent timber pieces, the joining bracket comprising:
 a releasable clamp for clamping onto a bar and configured to slide along the bar when released; and
 a plate configured to be fastened to the adjacent timber pieces. In an embodiment, the plate has formed therein a plurality of apertures for fasteners. The plurality of apertures may be distributed on either side of the clamp.

Disclosed herein is a system of devices for clamping a plurality of pieces of formwork, the system comprising:
 a clamping mechanism coupling the plurality of devices for holding a piece of formwork, each of the plurality of devices for holding a pieces of formwork being in accordance with the above disclosure;
 an adjustable arm attached to the clamping mechanism, wherein attached to the adjustable arm is a jaw for clamping a piece of formwork.

BRIEF DESCRIPTION OF THE SEVERAL VIEWS OF THE DRAWINGS

Embodiments will now be described by way of example only with reference to the accompanying figures.

FIG. 1 shows a side elevation view an embodiment of a device for clamping a piece of formwork.

FIG. 2 shows another side elevation view of the device of FIG. 1.

FIG. 3 shows a plan view of the device of FIG. 1.

FIGS. 4 and 5 show a side view and a plan view of a jaw of the device of FIG. 1.

FIG. 6 shows a perspective view of formwork for making a concrete slab, the formwork comprising a plurality of devices of FIG. 1.

FIGS. 14 and 15 show respectively a side elevation view of still yet another embodiment of a device for clamping a piece of formwork, and a detail of an attachment element of the device.

FIGS. 18 and 19 show respectively side elevation and top views of the jaw and the other jaw, each in the first mode, engaging a piece of formwork.

FIGS. 20 and 21 show respectively side elevation and top views of the jaw and the other jaw, each in the second mode, engaging the piece of formwork.

DETAILED DESCRIPTION OF THE INVENTION

Figure 7:
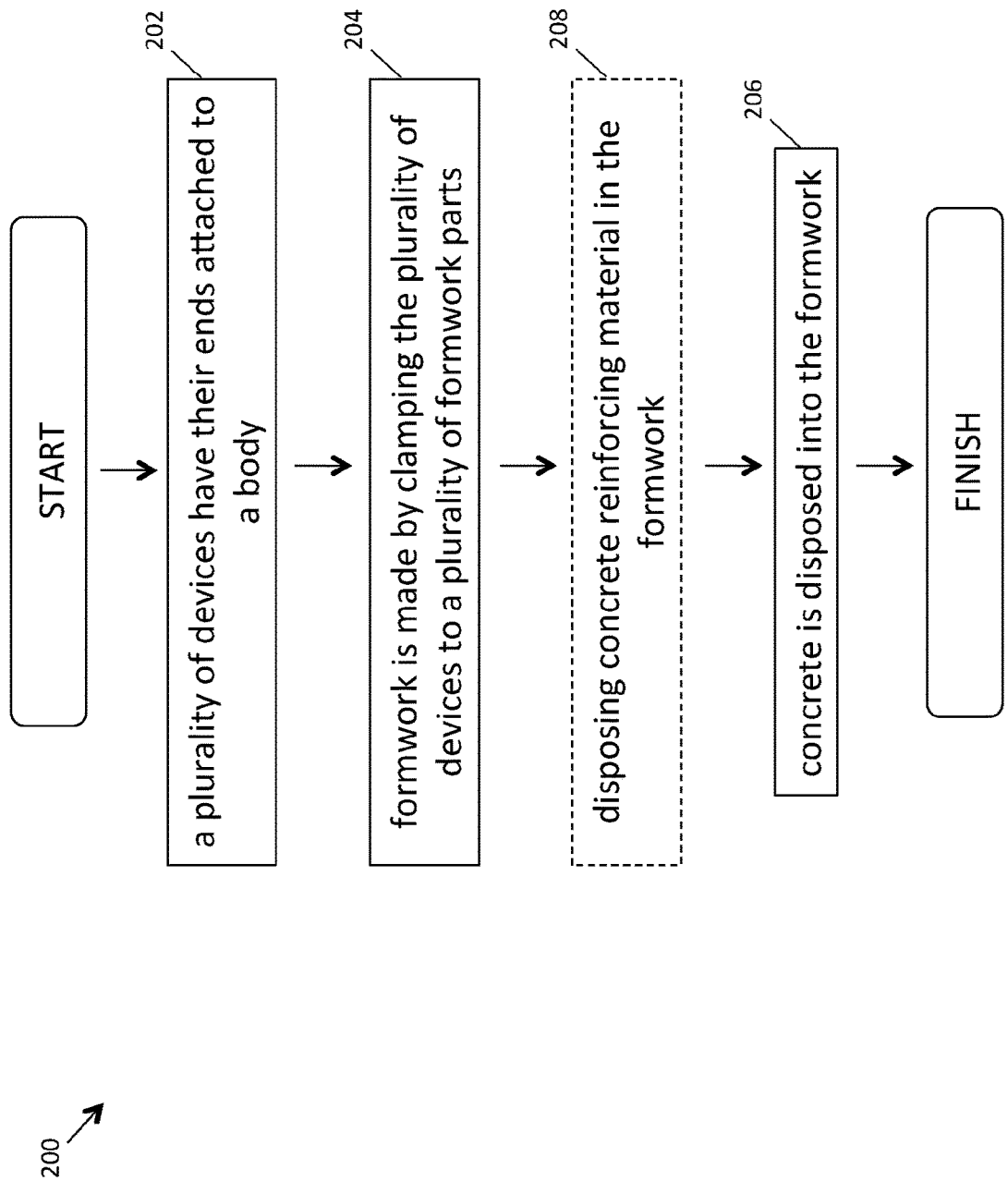
FIG. 7 shows a flow chart of an example method of making a concrete slab.

FIGS. 1 to 3 show various views of a device for clamping a piece of formwork, the device being generally indicated by the numeral 10. The device 10 has a bar 12 that in this but not all embodiments is in the form of a rod having a circular cross section. The bar 12 has an end 14 for attachment to a body. In this but not all embodiments, the end 14 comprises a spike for driving into a body in the form of ground, and when so driven into the ground the bar is attached thereto.

The device 10 has a jaw 16 mounted to the bar 12 for receiving the piece of formwork and another optional jaw 18 which may be removed from the bar 12. The jaw 16 is movable along the bar. A piece of formwork may be engaged by the jaw 16 and a lower surface of the piece of formwork may be held to the ground by the jaw 16, adjusted for the dimensions of the piece of formwork.

Figure 13:
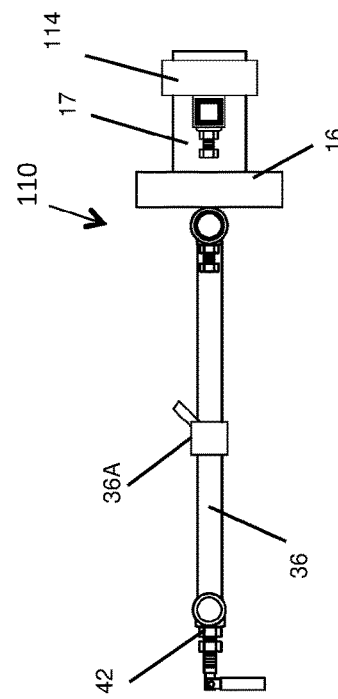
FIGS. 12 and 13 show a side elevation view and a top view respectively of yet another embodiment of a device for clamping a piece of formwork.
Figure 12:
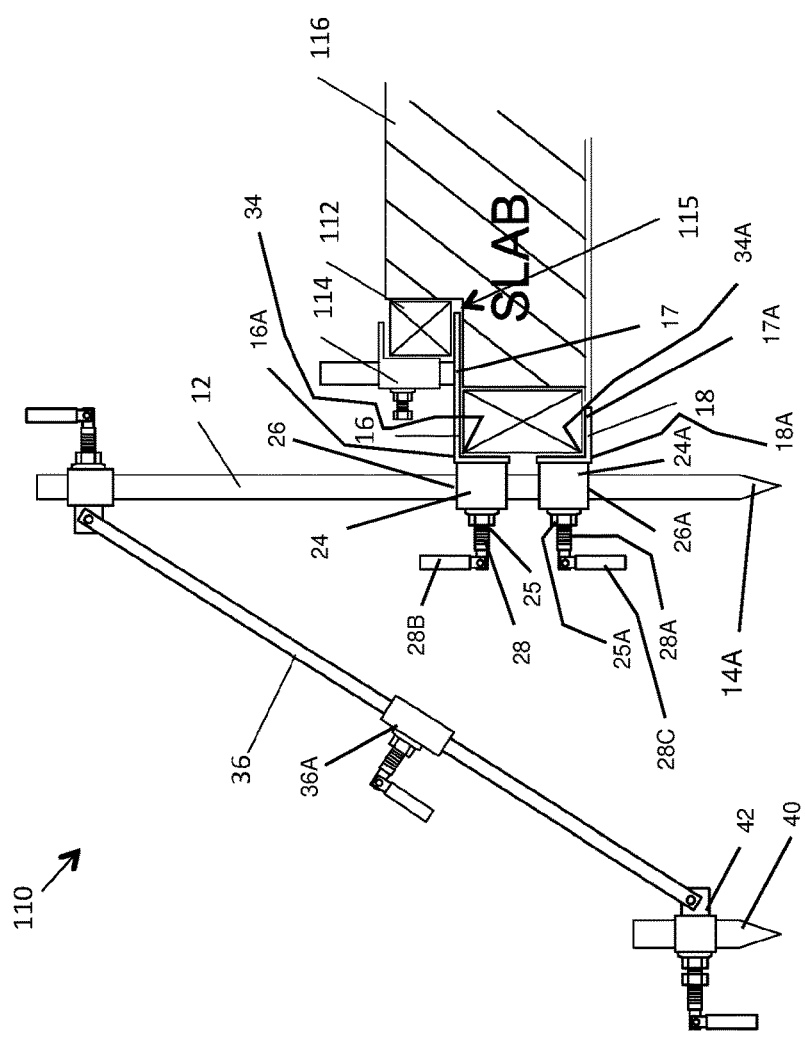

In the embodiment of FIG. 1 and FIGS. 12-13, the first jaw 16 has a first movable mode and a first immovable mode, and the second jaw 18 has a second movable mode and a second immovable mode. In the first movable mode, the first jaw 16 is movable along the bar. In the first immovable mode, the first jaw 16 is immovable along the bar. In the second movable mode, the second jaw 18 is movable along the bar. In the second immovable mode, the second jaw 18 is immovable along the bar. The jaw 16 has a releasable clamp 20. In the first immovable mode the releasable clamp 20 is clamped to the bar 12. In the first movable mode the releasable clamp 20 is not clamped to the bar 12. The jaw 16 is free to slide along the bar 12 when jaw 16 is in the first movable mode. The piece of formwork may also be received by the other optional (second) jaw 18. In the first movable mode, the jaw 16 may be moved to receive the piece of formwork. The jaw 16 may then be placed in the first immovable mode to clamp the piece of formwork between the first jaw 16 and the second jaw 18. The jaw 16 and the second jaw 18 may clamp the piece of formwork more tightly than the jaw 16 alone with the earth, which may result in more robust formwork for larger jobs or jobs requiring more precision. FIGS. 4 and 5 show a side view and a plan view of the first jaw 16 (the second jaw 18 is the similar as first jaw 16 but some embodiments have differences). The first jaw 16 comprises first angled bracket 16A or 22 having an outwardly projecting first flange 17. The first angled bracket has a laterally extending plate that is attached to the outwardly projecting first flange 17 at a first corner 34. In FIGS. 12-13, the second jaw 18 comprises a second angled bracket 18A having an outwardly projecting second flange 17A. The second angled bracket has a laterally extending plate that is attached to the outwardly projecting second flange 17A at a second corner 34A. An edge of a piece of formwork is received into the first corner 34 (upper corner edge for the first corner, lower corner edge for the second corner) in use. In an alternative embodiment, the jaw comprises any one or more of a block and a rectangular tube. The jaw may generally take any suitable form. A releasable clamp 20 of the first jaw 16 has a first tubular clamp body 24 in the form of a tube defining a first bar receiving passage 26 configured for receiving the bar 12. The releasable first tubular clamp body 24 has a first threaded passage 25 formed in the tube sidewall 27 for holding a first screw 28 operable to penetrate the first bar receiving passage 26. The second jaw 18 includes a second angled bracket 18A facing the first angled bracket so as to set an upper corner edge of the piece of formwork in the first angled bracket and a lower corner edge of the piece of formwork in the second angled bracket. The second jaw 18 also incudes a second tubular clamp body 24A with a second bar receiving passage 26A and a second threaded passage 25A. The bar is also slidable engaged through the second bar receiving passage. There is a second screw 28A removable engaged through the second threaded passage. The first screw 28 is in this embodiment in the form of a set screw that has a hexagonal head for engaging a socket driver, for example, although any suitable screw having any suitable head (e.g. a slotted head or a first handle 28B attached a head of the first screw 28 or a second handle 28C attached to a head of the second screw 28A) may be used. The first threaded passage 25 is opposite the first angled bracket of the first jaw 16 (the second threaded passage 25A is opposite the second angled bracket of the second jaw 18) and in this embodiment opposite the outwardly projecting first flange 17 or second flange 17A, respectively. The bar receiving passage of each of the releasable clamps may have a first opening and a second opening. The threaded passage and the jaw may be closer to one of the first opening and the second opening.

Figure 9:
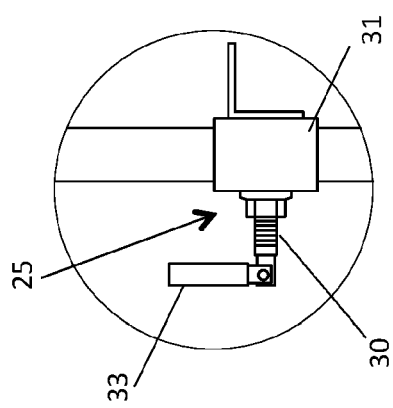
FIGS. 9 and 10 show alternative releasable clamps that may be used with the device of FIG. 1.
Figure 10:
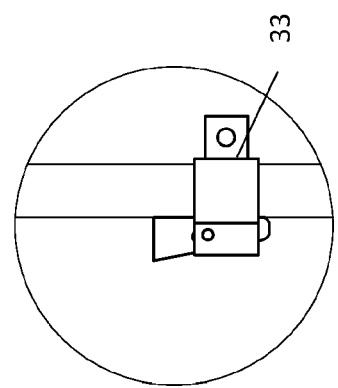

Alternative releasable clamps 31 and 33 are shown in FIGS. 9 and 10. The clamp 31 of FIG. 9 has a screw 30 having a finger operable actuator in the form of a foldable wing 33. Generally any suitable releasable clamp may be used. The embodiments described herein has a bar 12 having a circular cross section. Consequently, the clamps 20 and 32 may be rotated around the bar 12. This facilitates alignment of the jaws 16,18 with the pieces of formwork, which may result in more robust formwork and ease installation. The bar 12 may have a square or generally any suitable cross section. In the embodiment of FIGS. 1 to 3, jaw 18 also has a first mode and a second mode. In the first mode the jaw 18 is movable along the bar 12. In the second mode, jaw 18 is immovable along the bar. Jaw 18 has a releasable clamp 32 that is clamped to the bar 12 in the second mode and undamped from the bar 12 in the first mode. Releasable clamp 32 has similar or identical structure to clamp 20. In an alternative embodiment, however, jaw 18 is permanently fixed to the bar 12 while jaw 16 is movable. In yet another alternative embodiment, jaw 16 is permanently fixed to the bar 12 while jaw 18 is movable. While having both jaw 16 and jaw 18 movable along the bar may be convenient in some circumstances, it may not be required in all circumstances.

The device 10 comprises steel, however other embodiments may comprise a glass reinforced plastic, or generally any suitable material.

The device 10 has an optional prop 36 pivotally coupled to the bar 12 via a proximal pivot 38. Other embodiments do not have props. The prop 36 has a distal spike 40 for driving into ground. The distal spike 40 is pivotable around a distal joint 42 in the form of a pivot joint. The prop 36 is coupled to the bar 12 by another releasable clamp 44 or prop clamp 36A. When the releasable clamp 44 or prop clamp 36A is released, the clamp or prop clamp 36A is movable along the bar 12 and may be decoupled from the bar 12. The clamp 44 or prop clamp 36A is immovable along the bar 12 when the releasable clamp is engaged. A user may adjust the position of the releasable clamp 44 or prop clamp 36A to the best position for each use. For example, the ground at the spike 40 may be higher or lower than the end 14, in which case the releasable clamp 44 or prop clamp 36A may be raised or lowered. This may improve the support provided by the prop 36.

The prop 36 has a length adjustment mechanism 52 in the form of a telescopic length adjustment mechanism. The prop 36 has an outer tube 46 which slidably receives an inner tube 48. The length adjustment mechanism has a locking mechanism 50 in the form of a clamp comprising a screw 54 in the form of a set screw. The locking mechanism 50 can be operated by turning the screw in or out to switch the length adjustment mechanism between an operable and non-operable mode. In the operable mode the inner tube 48 can be slid within the outer tube 46 to shorten or lengthen the prop 36. In the non-operable mode the point of the screw 54 penetrates through the wall of the outer tube 46 to frictionally engage the inner tube 48 so that the position of the inner tube 48 relative to the outer tube 46 is fixed. In the non-operable mode, the length of the prop 36 is fixed. FIG. 6 shows a perspective view of formwork 56 for making a concrete slab. FIG. 7 shows a flow chart of an example of a method 200 for making a concrete slab. Steps for the example of the method are now described with reference to FIGS. 6 and 7. In a step 202, a plurality of devices 10 have their ends 12 attached to a body in the form of the ground, for example. In this but not in all embodiments, the end 12 is driven into ground. In another step 204, formwork is made by clamping the plurality of devices 10 to a plurality of formwork parts 58, 60, 62, 64 in the form of lengths of timber (which is an example of a piece of formwork). The jaws 16 and 18 of each of the plurality of devices 10 are clamped on to the plurality of formwork parts. The formwork 56 is, in this but not necessarily all embodiments, a temporary mould for making the concrete slab. In another step 206, concrete is disposed into the formwork. The concrete is, in this but not all embodiments, poured into the formwork. In an alternative example, cement is mixed with water and aggregate in the formwork.

Optionally, the lengths of the props 36 of the plurality of devices 10 may be adjusted to provide the selected degree of shoring up. To adjust the props 36 the locking mechanism 50 is released to switch the length adjustment mechanism into the operable mode. The inner tube 48 is then slid within the outer tube 46 until the selected length is achieved. The locking mechanism 50 is then engaged to switch the length adjustment mechanism into the non-operable mode.

In this example, but not necessarily for all examples, the method 200 includes the optional step 208 of disposing concrete reinforcing material 59 in the formwork. The reinforcing material may be in the form of, for example, reinforcing mesh optionally supported by chairs, and/or reinforcing bars. The reinforcing material is embedded in the concrete slab formed.

After the wet concrete has set and the concrete slab formed, the plurality of devices 10 may be unclamped from the plurality of formwork parts 58, 60, 62, 64 and detached from the ground. The formwork in the embodiment of FIG. 6, for example, may be subsequently removed without requiring the removal of fasteners, for example screws or nails, which may be time consuming or tricky to remove. The plurality of formwork parts 58, 60, 62, 64 are generally not damaged by the devices 10. Consequently, the plurality of formwork parts 58, 60, 62, 64 may have a longer lifetime then formwork parts that have been penetrated by fasteners and possibly further damaged by subsequent removal of the penetrating fasteners. The formwork 56 may be free of nails that may otherwise protrude therefrom, presenting a danger to workers.

Figure 8:
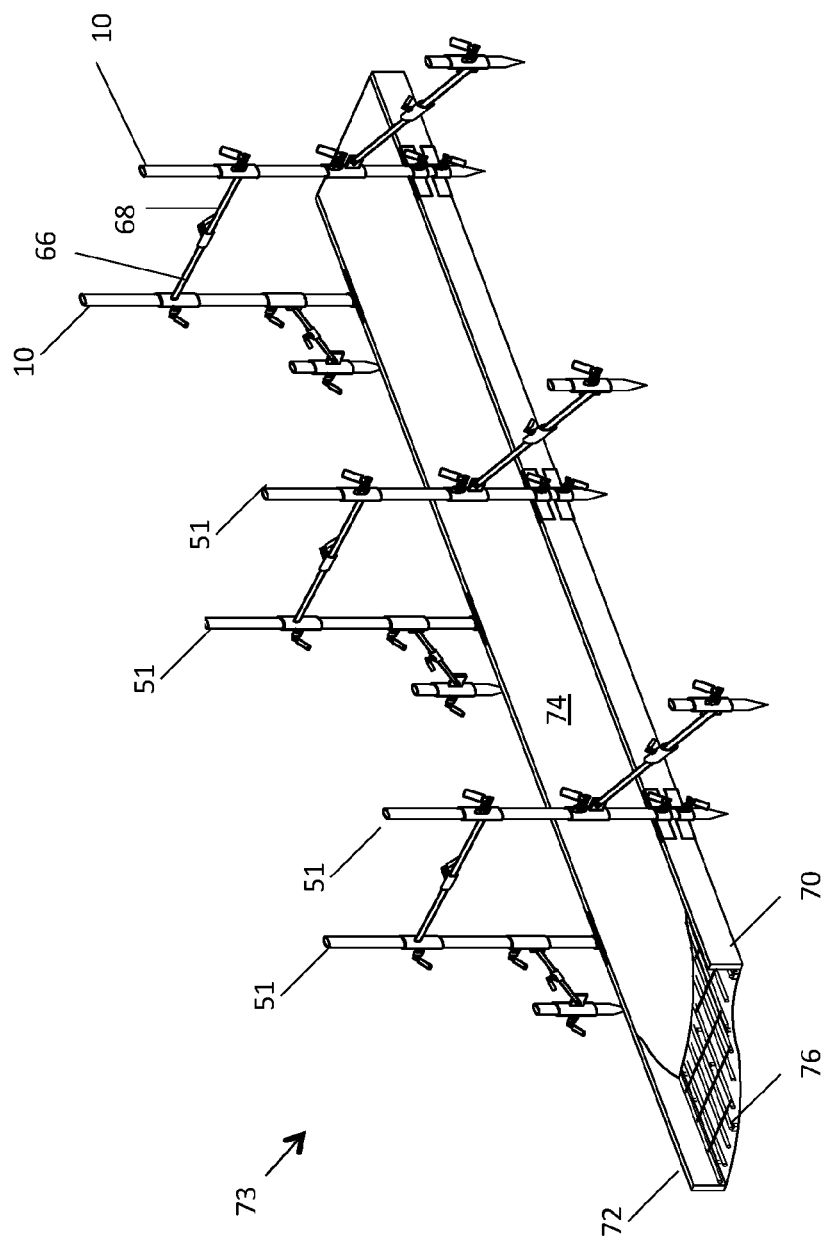
FIG. 8 shows a perspective view of a plurality of devices of FIG. 1 clamping a plurality of formwork parts.
Figure 11:
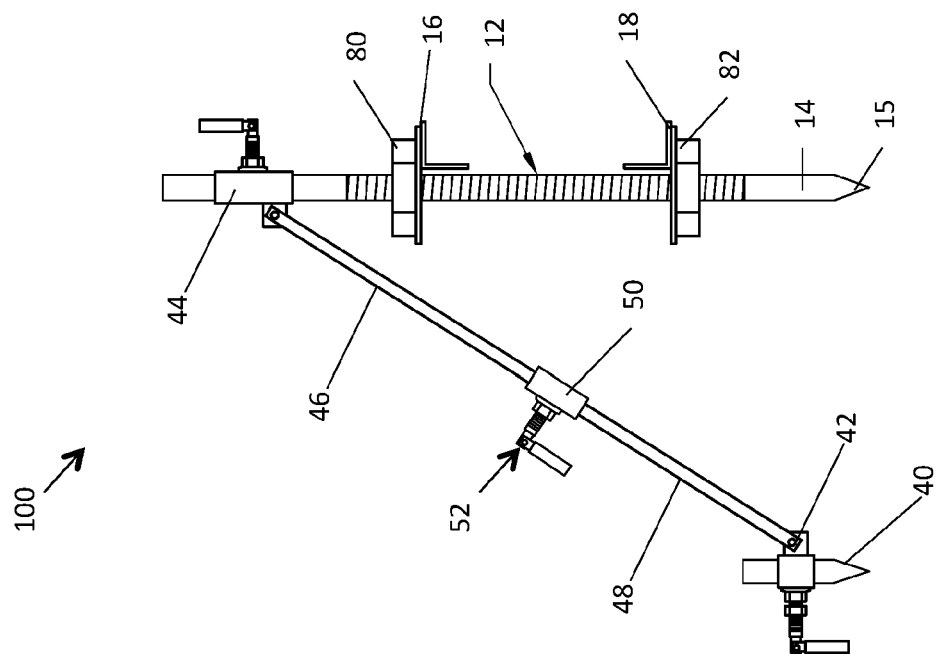
FIG. 11 shows a side elevation view of another embodiment of a device for clamping piece of formwork.

FIG. 8 shows a perspective view of a plurality of devices 10, 51 clamping a plurality of formwork parts 70, 72. The devices 1 are similar or identical to devices 10. Wet concrete 74 has been disposed in the formwork 73 so formed. Prior to pouring of the wet concrete 74 reinforcing material 76 in the form of reinforcing mesh was disposed in the formwork 73. The plurality of devices 10 are connected by a spar 66. Spar 66 has an adjustable length. In this embodiment spar 66 is telescopic. The spar has a locking mechanism 68. The length of the spar 66 may be fixed by a locking mechanism 68. FIG. 11 shows a side elevation view of another embodiment of a device for clamping a piece of formwork, the device being generally indicated by the numeral 100. Parts having similar or identical form and/or function to those shown in FIGS. 1-3 are similarly numbered. The device 10 has a threaded bar 12 in the form of a threaded rod. The bar 12 has an end 14 in the form of a spike for driving into ground. Mounted to the bar 12 are two jaws 16, 18. The jaws 16, 18 are movable along the bar for clamping the piece of formwork between the jaw 16 and the jaw 18. The bar has a thread 84 and a nut 80 engaged with the thread and operable to abut the first jaw. The bar has another nut 82 engaged with the thread and operable to abut the second jar.

FIGS. 12 and 13 show a side elevation view and a top view respectively of yet another embodiment of a device for clamping a piece of formwork, the device being generally indicated by the numeral 110. Parts having similar or identical form and/or function to those shown in FIGS. 1-3 are similarly numbered. The first jaw 16 comprises a moulding element 112 clamped thereto by a moulding element clamp 114 on the first flange 17 away from the second flange 17A for forming a rebate 115 in a concrete slab 116 made using the piece of formwork. The moulding element may be, for example, a length of timber.

FIG. 14 shows a side elevation view of still yet another embodiment of a device 120 for clamping a piece of formwork and FIG. 15 shows a detail thereof. The device 120 has attachment elements 126, 129 that each have at least one aperture. In use, fasteners pass through the apertures and into the body in the form of, for example, a solidified concrete slab, a steel slab, or generally any suitable body. The fasteners may be any suitable mechanical fastener, for example a screw, DYNABOLT™, or generally any suitable form of fastener. The attachment element 126, 129 each have a bottom 128, 131 perpendicular to the bar 12, the bottom 128, 131 being for contacting the body. The attachment element 126 is fastened to the bar 12 by a releasable clamp 124. In alternative embodiments, the attachment element 126 may be inseparable from the bar 12 and may be fixed by welding, mechanical fasteners, adhesive or generally any suitable method.

Figure 16:
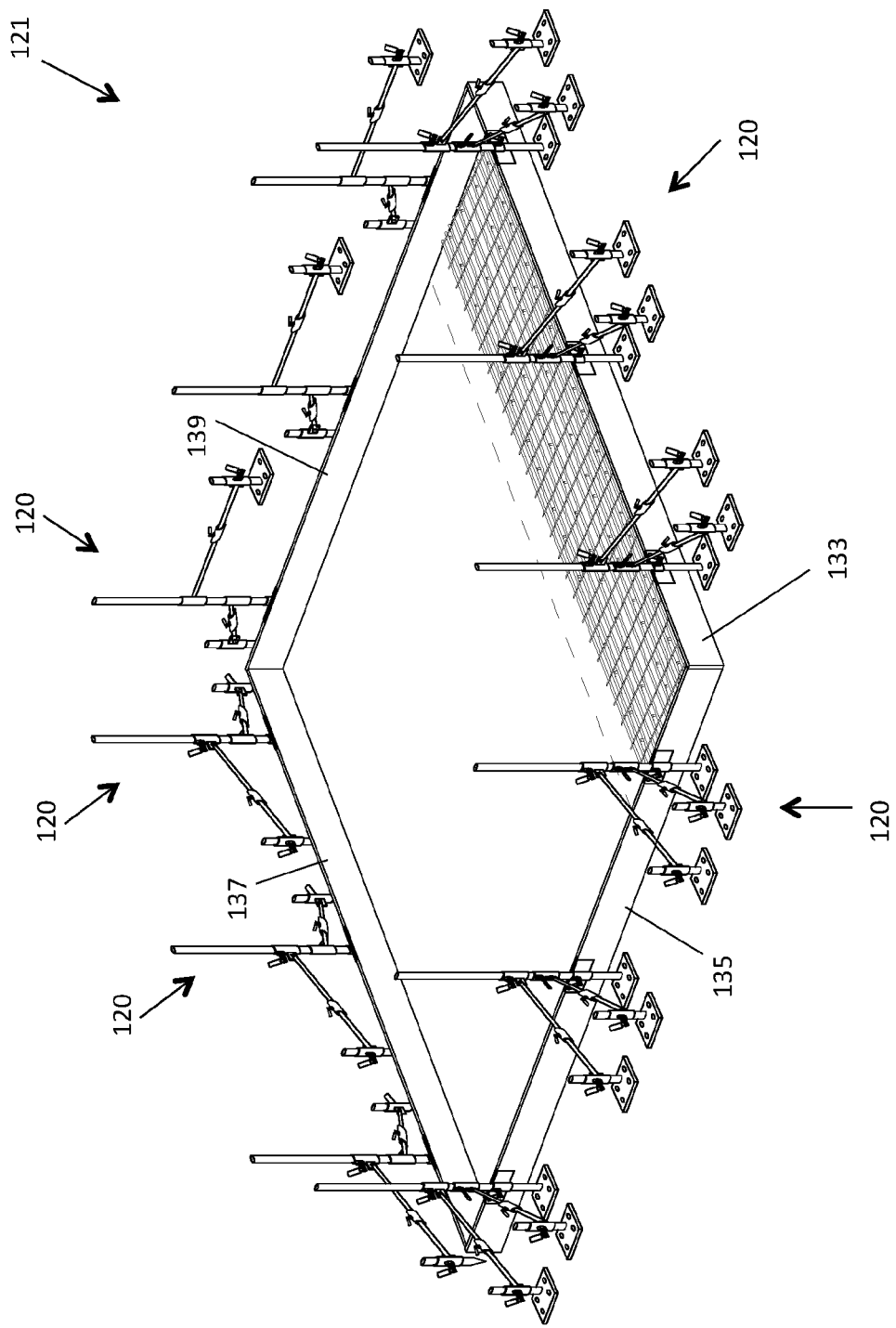
FIG. 16 shows a perspective view of formwork for making a concrete slab, the formwork comprising a plurality of devices of FIG. 13.
Figure 17:
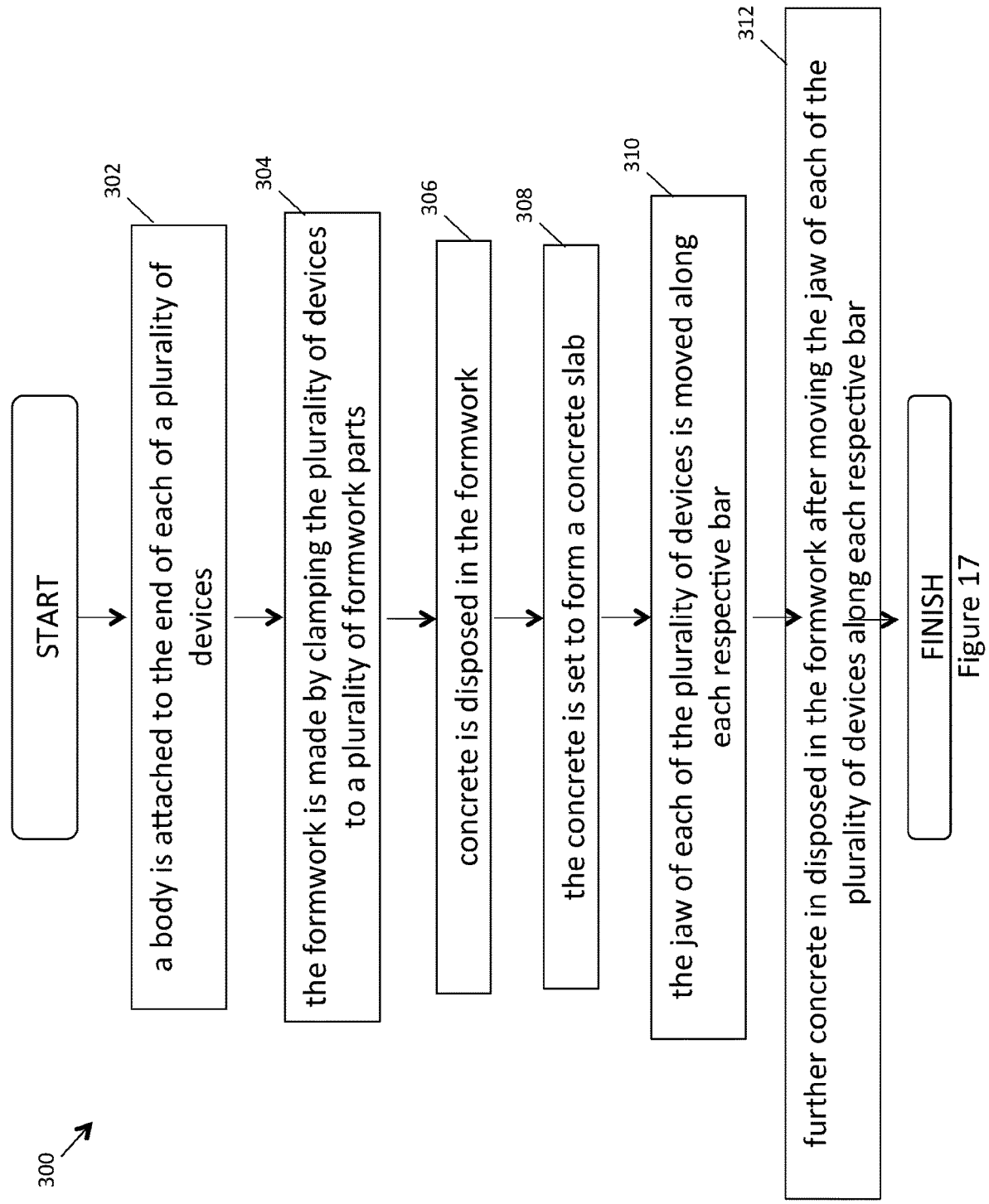
FIG. 17 shows a flow chart of an example of a method of making a plurality of concrete slabs.

FIG. 16 shows a perspective view of formwork 121 for making a concrete slab, the formwork comprising a plurality of devices 120 of FIG. 14. Parts having similar or identical form and/or function to those shown in FIGS. 1-3 are similarly numbered. The embodiment of FIGS. 14 and 15 may be suitable for the formation of a stack of concrete slabs. Similarly, the formwork of FIG. 16 is suitable for the formation of a stack of concrete slabs (as may be the other embodiments disclosed herein). FIG. 17 shows a flow chart of an example of a method 300 of making a plurality of concrete slabs. The method 300 will now be described with reference to FIGS. 16 and 17. In a step 302, a body is attached to the end of each of a plurality of devices 120. In another step 304, the form work 121 is made by clamping the plurality of devices 120 to a plurality of formwork parts 133-139. In yet another step 306, concrete is disposed in the formwork 121. In still yet another step 308, the concrete is set to form a concrete slab. In still another step 310, the jaws of each of the plurality of devices is moved along each respective bar, which may comprise moving the jaws of each of the plurality of devices upward along each respective bar. Both the jaw 16 and the other jaw 18 may be moved upward along each respective bar. Moving the jaw of each of the plurality of devices may lift the plurality of formwork parts 133-139. In yet still another step 312, further concrete in disposed in the formwork after moving the jaw of each of the plurality of devices along each respective bar. The step of disposing further concrete may comprise the step of laying a sheet of impermeable material on the concrete slab. This may prevent the further concrete from sticking to the concrete slab. The further concrete may be set to form a further slab. Steps 310 and 312 may be repeated to form as many slabs as desired and possible using the devices 120.

Figure 22:
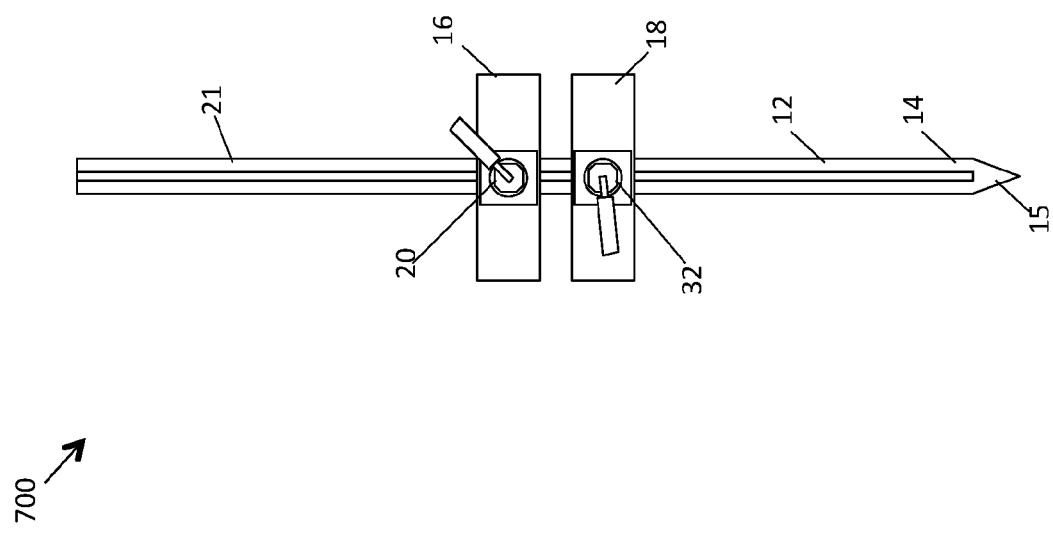
FIG. 22 shows a side elevation view an embodiment of a device for clamping a piece of formwork.

FIGS. 18 and 19 show respectively side elevation and top views of the jaw 16 and other jaw 18, each in the first mode, engaging a piece of formwork 130. FIGS. 20 and 21 show respectively side elevation and top views of the jaw 16 and other jaw 18, each in the second mode, engaging the piece of formwork 130. Changing the mode of the jaw and other jaw of each of the plurality of devices from the first mode to the second mode causes the jaw 16 and other jaw 18 to torque into the piece of formwork 130, which generally may result in an improved grip of the jaws 16, 18 on the piece of formwork. Changing the mode of the jaw and other jaws 16, 18 from the first mode to the second mode deform the releasable clamp body of the jaw and other jaw 16, 18 to torque into plurality of pieces of formwork. When the screw 35 penetrates the bar receiving passage 26 and engages the bar 12, the threaded passageway is pushed outwardly to form an oval bar receiving passageway. This has the effect of pushing the sidewall of the tube 24 opposite the threaded passage 25, at which the jaw is disposed and attached, away from the bar 12, thereby torquing the distal end 19 of the flange 17 downwards. FIG. 22 shows a cross section of still another embodiment of a device 700 for clamping a piece of formwork. Parts similar or identical in form and/or function to those elsewhere described herein are similar numbered. The jaws 16, 18 each have a bar coupling configured to be captured in a longitudinal slot 21 formed in the bar 12. The bar coupling is slidable within the longitudinal slot in the form of a keyway. In this embodiment, the bar-coupling comprises a T-shaped bracket and the slot comprises a T-shaped slot configured to capture the T-shaped bracket. In an alternative embodiment, however, the bar coupling comprises an outwardly flaring coupling and the slot comprises an inwardly flaring slot configured to capture the outwardly flaring coupling.

Figure 23:
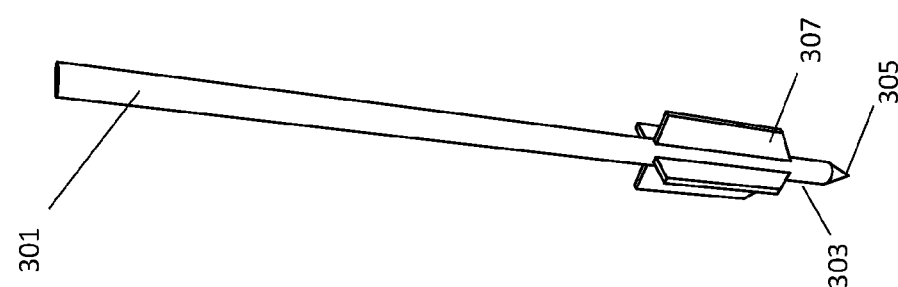
FIG. 23 shows a perspective view of an example of a bar that may form part of an embodiment of a device for clapping a piece of formwork.

FIG. 23 shows a perspective view of another example of a bar 301 that may form part of an embodiment of a device for clapping a piece of formwork. The bar 301 replaces the bar 12. The bar 301 has an end 303 having a distal spike 305 and a plurality of wings 307. The plurality of wings 307 form a cross.

Figure 24:
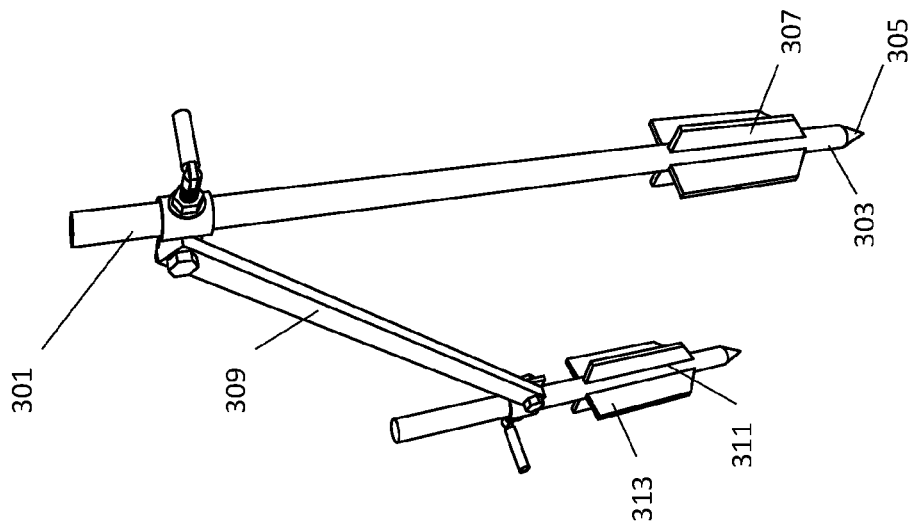
FIG. 24 shows the bar of FIG. 23 having attached thereto an example of a prop.

FIG. 24 shows the bar 301 of FIG. 23 having attached thereto a prop 309. The prop 309 has a distal spike 311 and a plurality of wings 313 adjacent thereto.

Figure 25:
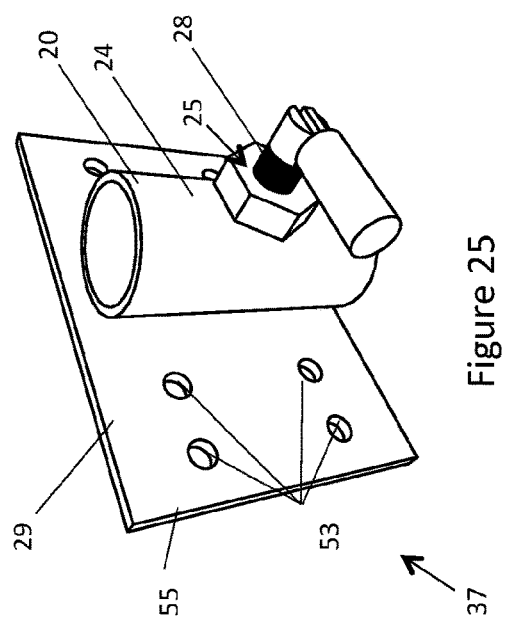
FIGS. 25 and 26 show an example of a joining bracket 37 for joining two adjacent timber pieces.
Figure 26:
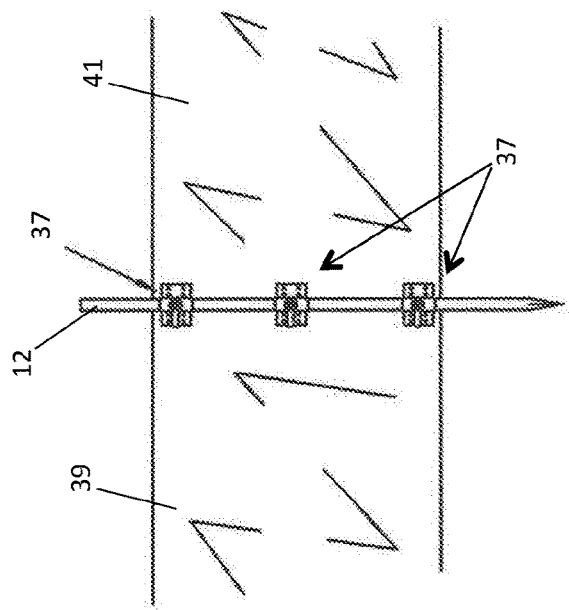

FIGS. 25 and 26 show an example of a joining bracket 37 for joining two adjacent timber pieces 39 and 41 in the form of timber sheets. Parts similar and/or identical in form and/or function to those described elsewhere are similarly numbered. The joining bracket 37 has a releasable clamp 20 for mounting on a bar 12 that may or may not be part of a device 20 for clamping a piece of formwork. The joining bracket 37 may slide along the bar for adjusting the position of the adjacent timber pieces, or adjusting the position of the joining bracket relative to the bar 12. The joining bracket 37 has a joiner 29 comprising a plate 55 having formed therein a plurality of apertures 53 distributed on either side of the clamp for a plurality of fasteners. The fasteners may comprise any suitable form of fastener, for example nails and/or screws. In use, those of the plurality of apertures on one side of the clamp are for a first timber piece and the remaining apertures are for a second timber piece. The joining bracket may be used together with a device for clamping a piece of formwork to make more complex formwork.

Figure 27:
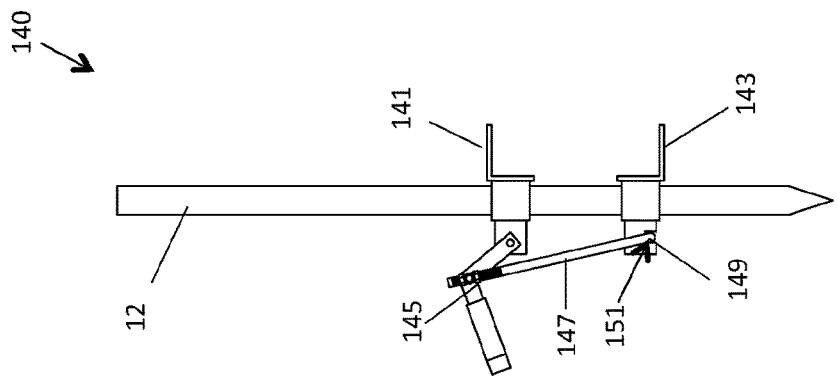
FIG. 27 shows an example of still yet another embodiment of a device 140 for clamping a piece of formwork.

FIG. 27 shows an example of still yet another embodiment of a device 140 for clamping a piece of formwork, where parts that are similar/identical in form and/or function to those described elsewhere are similarly numbered. The embodiment of FIG. 27 has a jaw 141 and another jaw 143. The jaw has a leaver 145 in the form of a user operable lever that is operably coupled to a pull bar 147 having an end 149 configured to engage the other jaw 143. The end 149 comprises a transverse bar (which may be part of a loop or hook) that is received in an end receiver in the form of a groove or notch 151 formed in the jaw 143. In use, the end 149 is received in the end receiver 151 and the lever 145 may be operated to pull the pull bar 147 to decrease the separation of the jaw 141 and the other jaw 143. In this arrangement, the jaws may grip a piece of formwork between the jaw 141 and the other jaw 143 particularly strongly.

Figure 28:
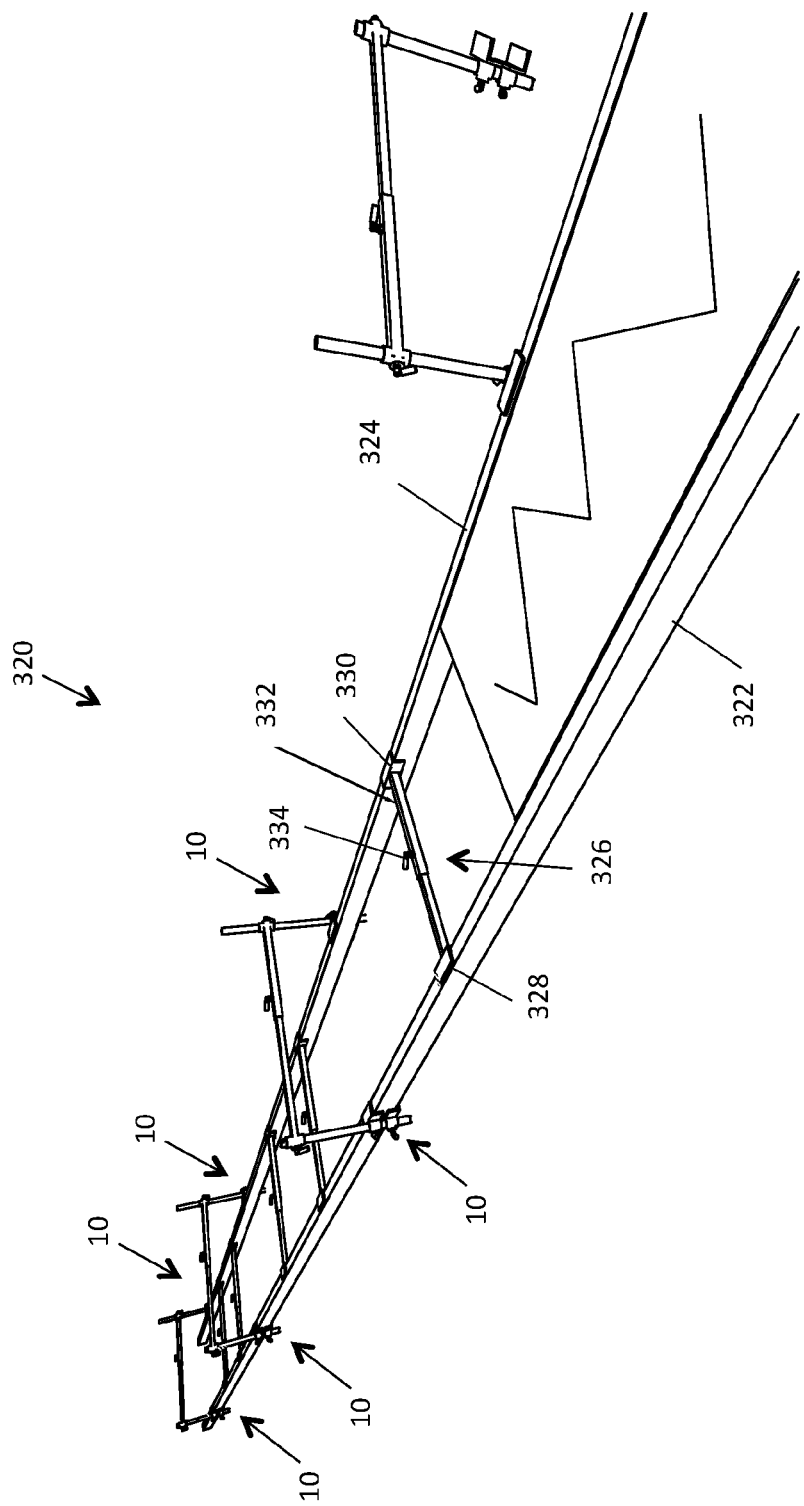
FIG. 28 shows example formwork comprising a plurality of devices for clamping a piece of formwork.

FIG. 28 shows example formwork 320 comprising a plurality of devices 10 for clamping a piece of formwork. The plurality of devices 10 clamp a first piece of formwork 322 and a second piece of formwork 324 to form formwork for a footpath. The separation of the first piece of formwork 322 and second piece of formwork 324 is defined by a spreader 326. The spreader 326 comprises a first end having a first formwork engager 328 and a second end having a second formwork engager 330. The first and second formwork engagers 328, 330 are spaced apart by a collapsible spar 332. The collapsible spar 332 comprises a releasable clamp 334 configured to prevent collapse of the collapsible spar 332. The collapsible spar 332 has an outer tube in which an inner tube is slidingly received. The clamp comprises a set screw that engages a threaded aperture formed in the side wall of the outer tube and penetrates the outer tube to engage the inner tube. The clamp may comprise any suitable mechanism.

Figure 29:
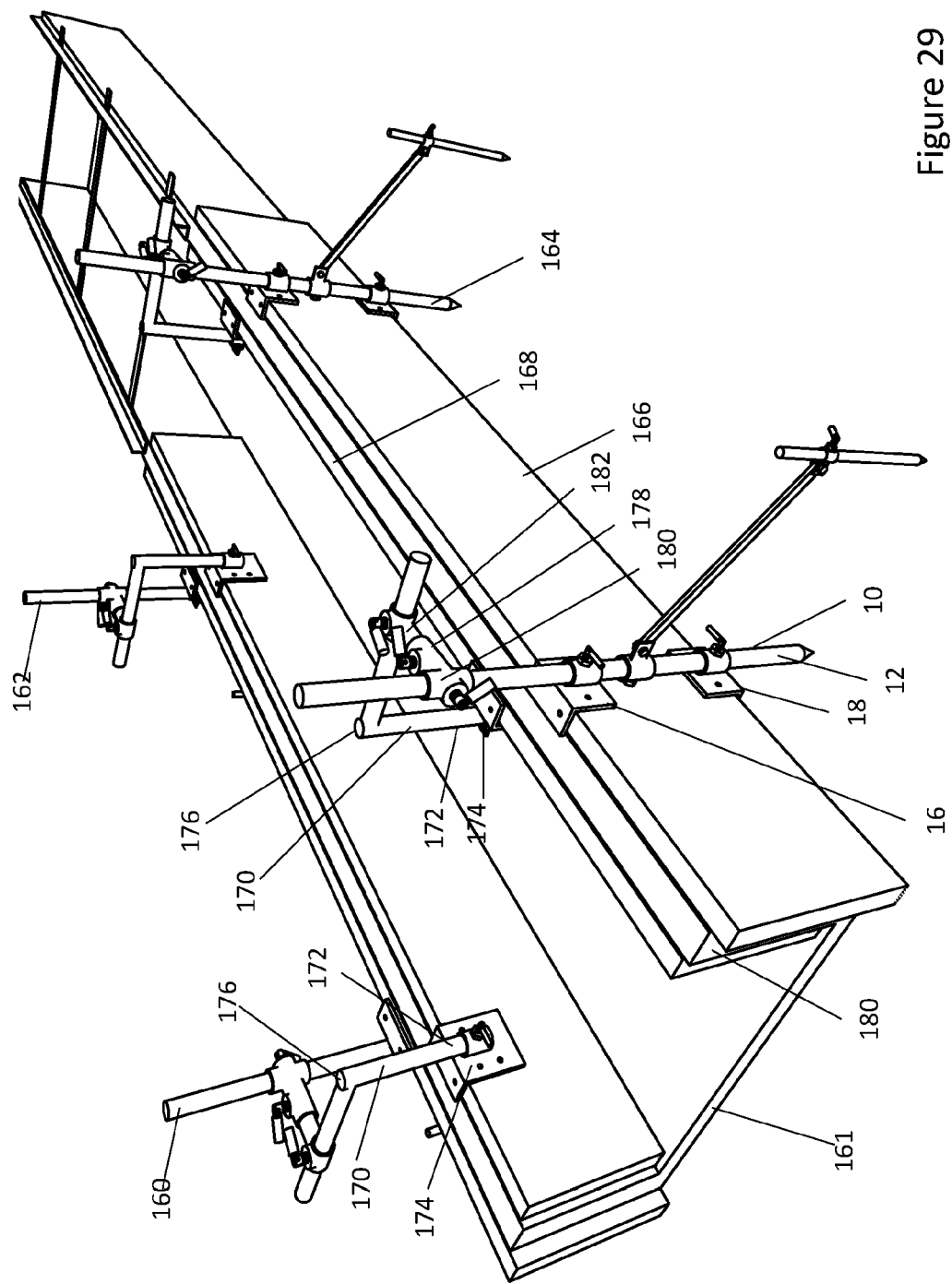
FIG. 29 shows a perspective view of a plurality of devices of FIG. 1 each adapted for clamping a proximal piece of formwork and a distal piece of formwork.

FIG. 29 shows a perspective view of a plurality of devices 10, 160, 162, 164 each adapted for clamping a proximal piece of formwork 166 and a distal piece of formwork 168, where parts similar in form and/or function are similarly numbered. The jaw 16 and the other jaw 18 of device 10 are mounted to the bar 12 and are configured for clamping the proximal piece of formwork 166. The device 10 has attached thereto an adjustable arm 170 having an elbow 176. In this embodiment the elbow is fixed, however in another embodiment the elbow is adjustable. The adjustable arm 170 has a distal end 172 laterally displaced from the bar 12 to extend over the proximal piece of formwork 166. Attached to the distal end 172 of the adjustable arm 170 is a jaw 174 for clamping the other piece of formwork 168 of the two parallel pieces of formwork 166, 168. A clamp 178 attaches the adjustable arm 170 to the bar 12. The clamp 178 comprises a first tube 180 for receiving the bar 12 and a second tube 182 orthogonal to the first tube 180 for receiving the adjustable arm. A first screw penetrates a sidewall of the first tube 180 and a second screw penetrates a sidewall of the second tube 182. The arm is slidable and rotatable within the second tube 182 and the bar is slidable and rotatable in the first tube 180. The device 10 may be adapted for arranging a first formwork piece 166 and a second formwork piece 168 for making a vertically orientated slab 180, which may assist in making a concrete trench 161, for example.

Figure 30:
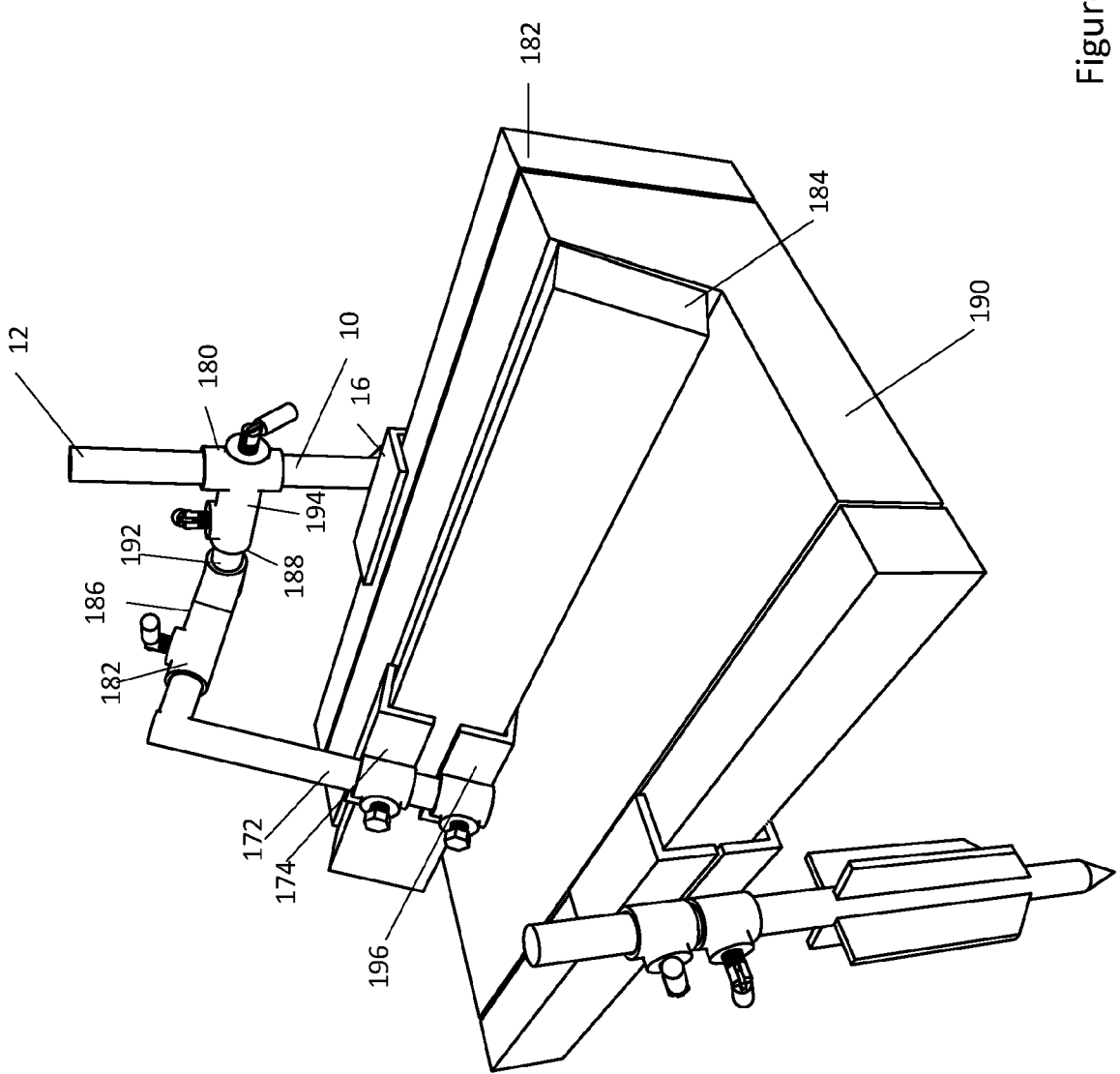
FIG. 30 shows the perspective view of a device of FIG. 1 adapted for clamping a proximal piece of formwork and a distal piece of formwork.

FIG. 30 shows the perspective view of another embodiment of a device 10 adapted for clamping a proximal piece of formwork 182 and a distal piece of formwork 184, where parts similar in form and/or function to those in FIG. 29 are similarly numbered. The clamp 186 has a joint 188 for adjusting the relative orientations of the first tube 182 and the second tube 180. The joint comprises an inner cylinder 192 received by an outer cylinder 194 and rotatable therein. This allows for the jaw 174 to be inclined relative to the jaw 16 and other jaw 18 (which is hidden). The distal piece of formwork 184 can thus be included relative to the proximal piece of formwork 182 which may assist in making a concrete gutter 190, for example. The distal end 172 also has another jaw 196 for clamping the distal piece of formwork 184.

Figure 31:
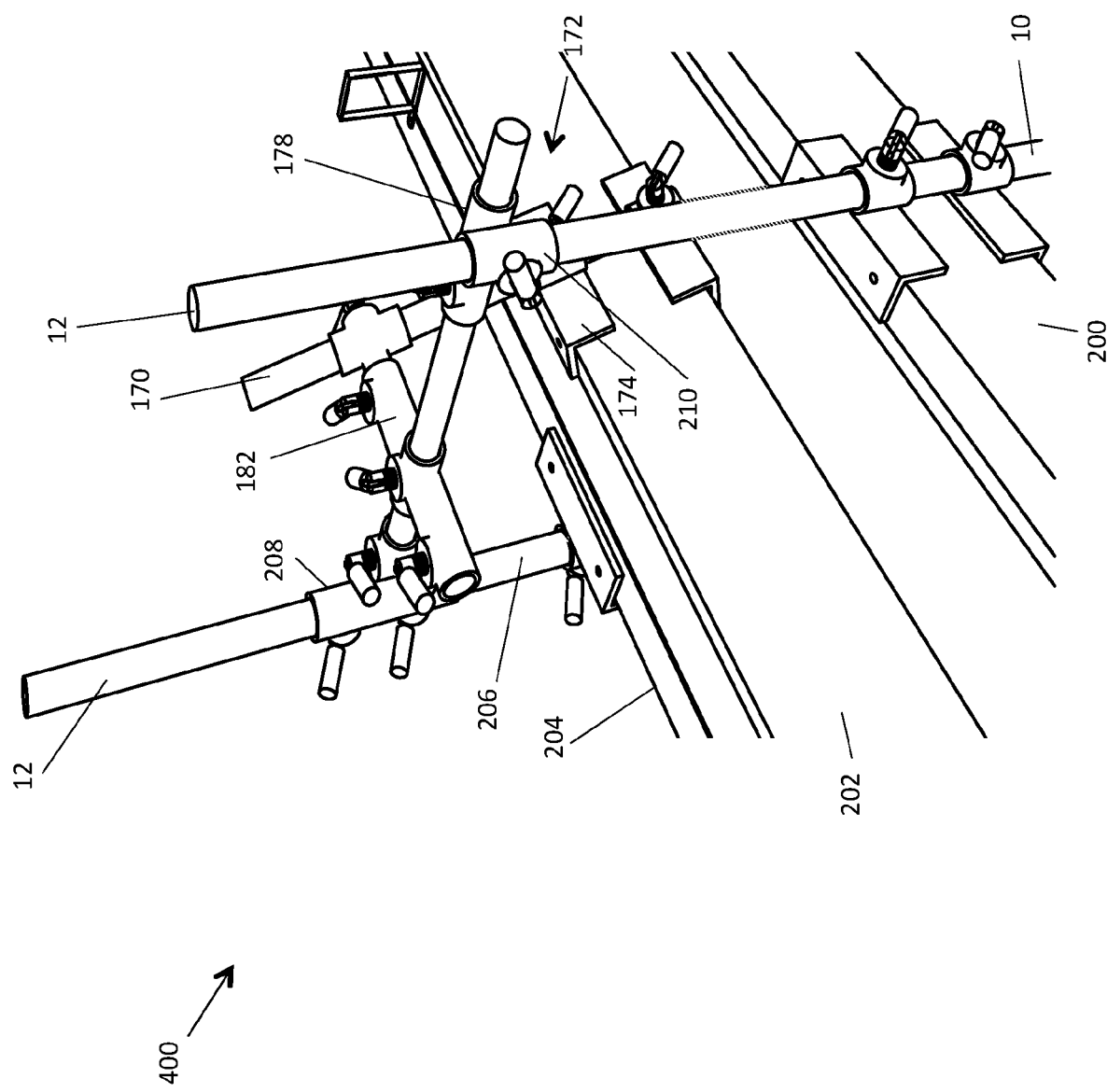
FIG. 31 shows a perspective view of an embodiment of a system of coupled devices for clamping a plurality of pieces of formwork.
Figure 32:
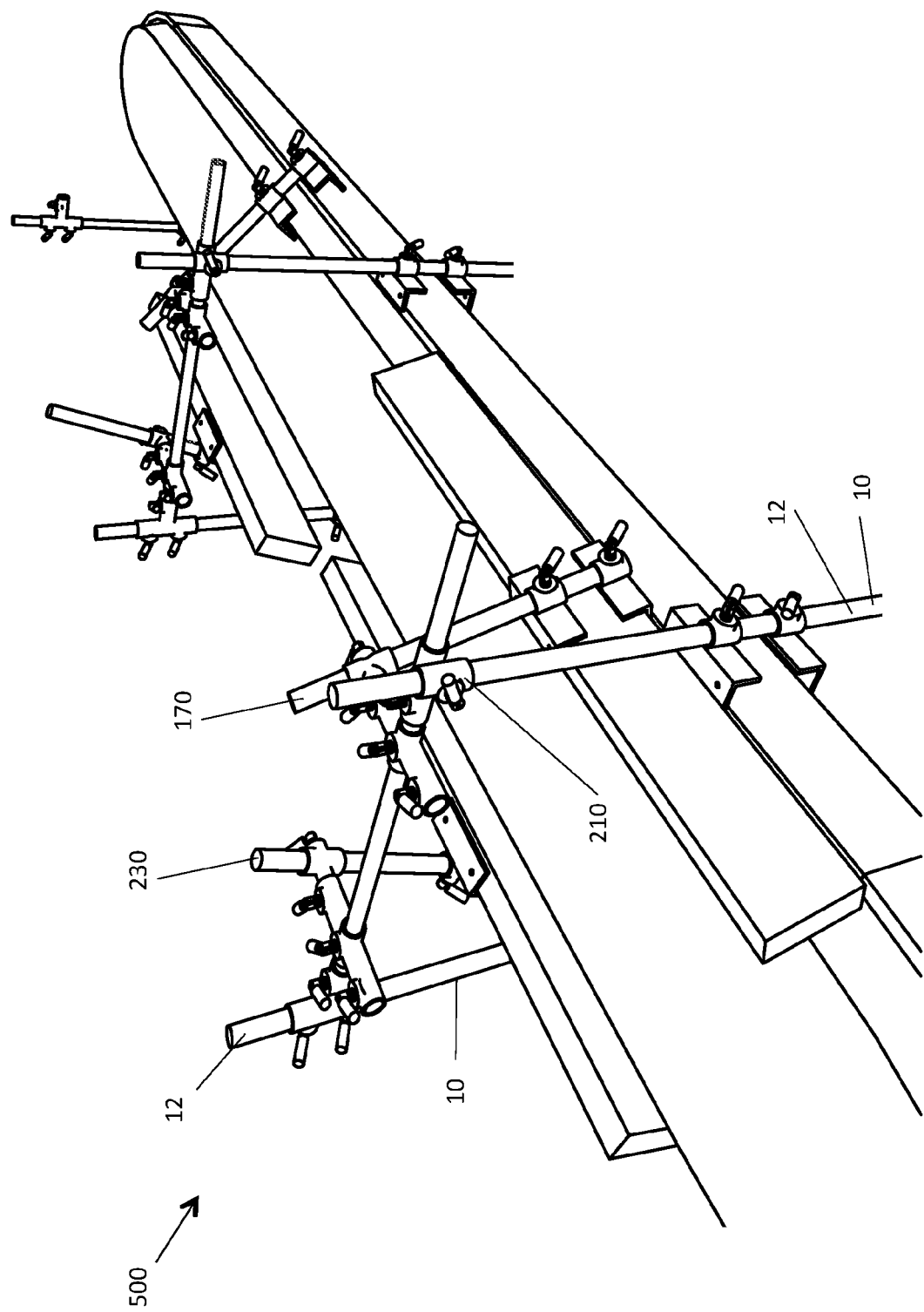
FIG. 32 shows a perspective view of another embodiment of a system of coupled devices for clamping a plurality of pieces of formwork.

FIG. 31 shows a perspective view of an embodiment of a system 400 of coupled devices for clamping a plurality of pieces of formwork. A first device 10 and a second device 206 are coupled by a clamping mechanism 210. The first device 10 clamps a piece of formwork 200 and the second device 206 clamps another piece of formwork 204. The clamping mechanism 210 has attached thereto an adjustable arm 170. Attached to the distal end 172 of the adjustable arm 170 is a jaw 174 for receiving a piece of formwork 202. The clamping mechanism 210 has a plurality of tubes in which are received the bars 12 and the adjustable arm 206. FIG. 32 shows a perspective view of another embodiment of a system 500 of coupled devices, the system 500 being similar to system 400. Parts having similar form and/or function are similarly numbered. System 500, however, has a second adjustable arm 230 and a clamping mechanism 210 that has a plurality of tubes which receive the bars 12, the adjustable arm 170 and the second adjustable arm 230.

Figure 33:
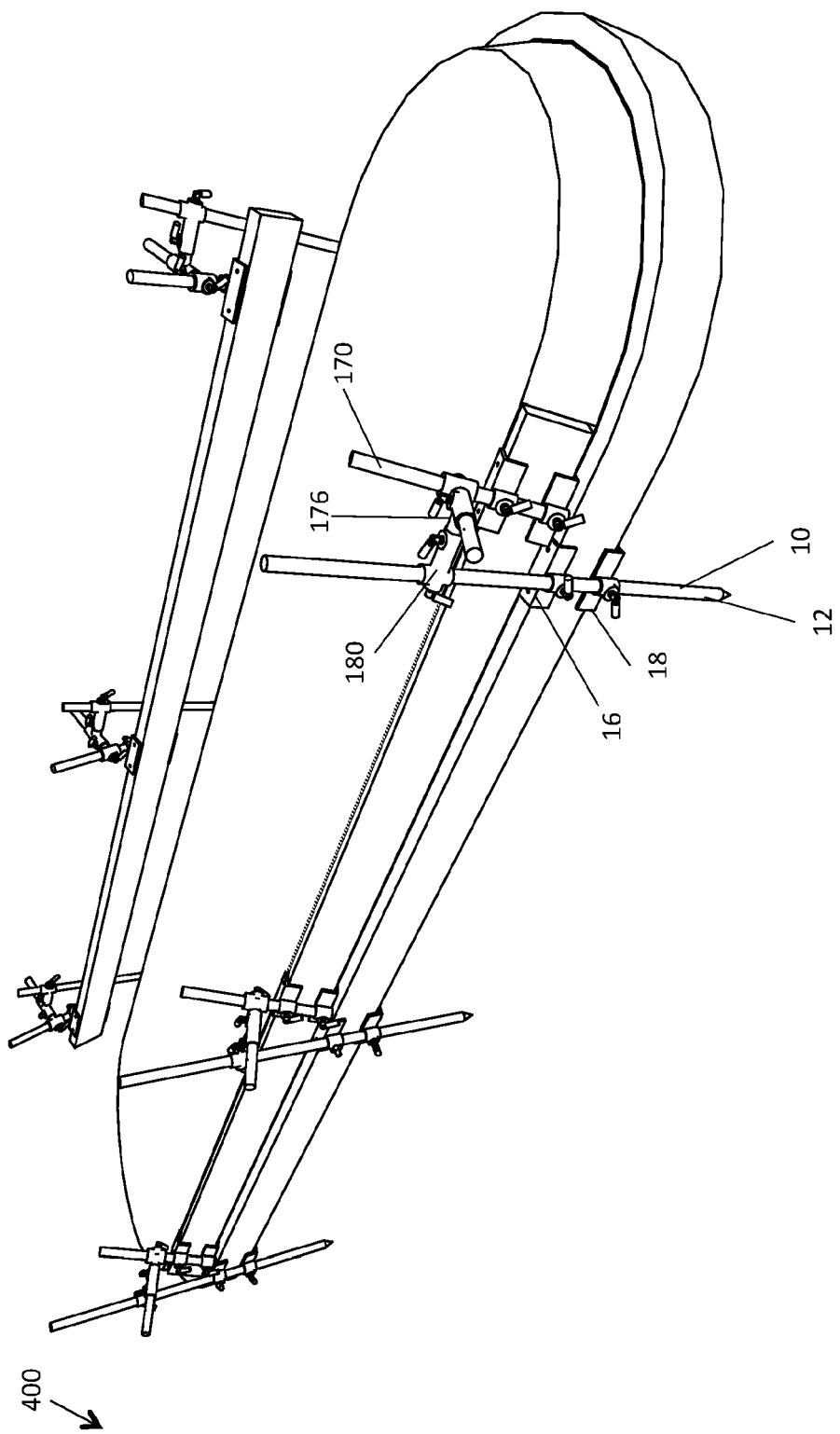
FIG. 33 shows a perspective view of a plurality of devices 10 of FIG. 1.

FIG. 33 shows a perspective view of a plurality of devices 10 of FIG. 1 each adapted for clamping a proximal piece of formwork and a distal piece of formwork, similar in function to that of FIG. 29. Parts having similar form and/or functions are similarly numbered. The elbow 176 of FIG. 33, however, is configured for adjustment and extension of the arm 170.

Figure 34:
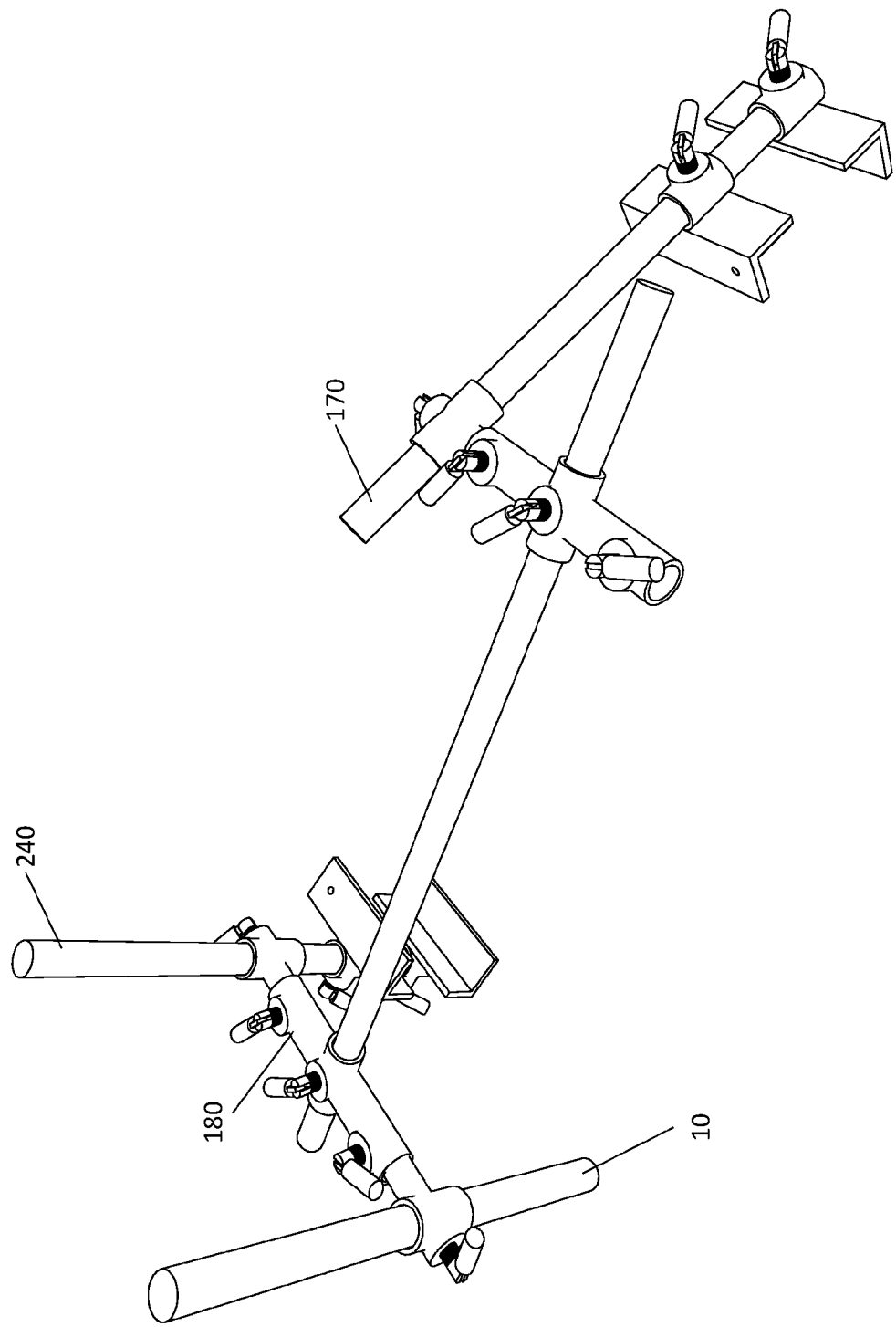
FIG. 34 shows a device of FIG. 1 adapted to clamp a plurality of pieces of formwork.

FIG. 34 shows a device 10 of FIG. 1 adapted to clamp a plurality of pieces of formwork. Parts having similar form and/or functions are similarly numbered. It has a clamping mechanism 180 that has a plurality of tubes which receive the bar 12, and at least two adjustable arms 170, 240.

Now that embodiments have been described, it will be appreciated that some embodiments may have some of the following advantages:

Installation and disassembly may be relatively fast. Removal of the formwork may be done 3-4 hours earlier, allowing the crew to finish the job in one day without returning on a subsequent day. This may increase the rate at which a critical project path may be advanced, and which may enable a concreter to turn over jobs at a significantly greater rate.

Disassembly of the formwork may be done without use of a hammer, which upon impact may fracture or damage the setting concrete.

A formwork carpenter may not be required, which may reduce cost and potential remove delays to the critical project path.

De-nailing of timber and stakes or pegs may not be required.

Shorting or cleaning of split timbers may not be required.

Continual replacement of damaged stakes and pegs and timber may not be required, resulting in less material consumption.

In situ level adjustment of formwork without disassembly thereof is possible, which may result in a considerable time saving.

Safer, for example the formwork may be free of nails that may otherwise protrude therefrom, presenting a danger to workers.

The prop may increase formwork strength, for example when the device is used in poor soils.

The prop's pivoting spike can meet the ground at different angles or be adjusted for different prop lengths, or compensate for sloping ground.

The use of props and/or spans may strengthen the formwork in a straightforward manner, which may be especially useful for the laying of thicker slabs (e.g. at least 200 mm thick).

No special tools may be required to install the devices, and no tools may be required for some embodiments.

The torqueing jaws may generally result in an improved grip of the jaws 16, 18 on the piece of formwork, so that the piece of formwork is not accidently dislodged when kicked or otherwise inadvertently interfered with. Variations and/or modifications may be made to the embodiments described without departing from the spirit or ambit of the invention. For example, not all embodiments have an end in the form of a spike, and the end may have any form suitable for attachment. The rod may have a square, hexagonal or generally any suitable cross section. The present embodiments are, therefore, to be considered in all respects as illustrative and not restrictive. Prior art, if any, described herein is not to be taken as an admission that the prior art forms part of the common general knowledge in any jurisdiction.

In the claims which follow and in the preceding description of the invention, except where the context requires otherwise due to express language or necessary implication, the word "comprise" or variations such as "comprises" or "comprising" is used in an inclusive sense, that is to specify the presence of the stated features but not to preclude the presence or addition of further features in various embodiments of the invention.

We claim:

1. A device for clamping a piece of formwork, the device comprising:
    a bar having an end with a spike for attachment to a ground;
    a first jaw being mounted on said bar and movable along said bar and having a first movable mode and a first immovable mode,
    wherein said first jaw comprises:
        a first angled bracket;
        a first tubular clamp body with a first bar receiving passage and a first threaded passage, said bar being slidable engaged through said first bar receiving passage; and
        a first screw removable engaged through said first threaded passage; and
    a second jaw being mounted on said bar and movable along said bar and having a second movable mode and a second immovable mode,
    wherein said second jaw comprises:
        a second angled bracket facing said first angled bracket so as to set an upper corner edge of said piece of formwork in said first angled bracket and a lower corner edge of said piece of formwork in said second angled bracket;
        a second tubular clamp body with a second bar receiving passage and a second threaded passage, said bar being slidable engaged through said second bar receiving passage; and
        a second screw removable engaged through said second threaded passage,
    wherein said first movable mode corresponds to said bar through said first bar receiving passage without contact by said first screw within said first bar receiving passage, wherein said second movable mode corresponds to said bar through said second bar receiving passage without contact by said second screw within said second bar receiving passage, wherein said first immovable mode corresponds to said bar through said first bar receiving passage with fixed contact by said first screw within said first bar receiving passage, wherein said second immovable mode corresponds to said bar through said second bar receiving passage with fixed contact by said second screw within said second bar receiving passage so as to apply a clamping force along said bar by said first screw and said second screw, wherein said first angled bracket is comprised of a first flange projecting outward from said bar and a first corner so as to be able to be aligned with said upper corner edge of said piece of framework, wherein said second angled bracket is comprised of a second flange projecting outward from said bar and a second corner so as to be able to be aligned with said lower corner edge of said piece of framework, and wherein said first corner and said second corner are between said first flange and said second flange.

2. The device, according to claim 1,
wherein said first threaded passage is opposite said first angled bracket, and
wherein said second threaded passage is opposite said second angled bracket.

3. The device, according to claim 1, furthering comprising:
a first handle attached to said first screw so as to pivotally rotate said first screw; and
a second handle attached to said second screw so as to pivotally rotate said second screw.

4. A device for clamping a piece of formwork, the device comprising:
a bar having an end with a spike for attachment to a ground;
a first jaw being mounted on said bar and movable along said bar and having a first movable mode and a first immovable mode,
wherein said first jaw comprises:
a first angled bracket;
a first tubular clamp body with a first bar receiving passage and a first threaded passage, said bar being slidable engaged through said first bar receiving passage; and
a first screw removable engaged through said first threaded passage;
a second jaw being mounted on said bar and movable along said bar and having a second movable mode and a second immovable mode,
wherein said second jaw comprises:
a second angled bracket facing said first angled bracket so as to set an upper corner edge of said piece of formwork in said first angled bracket and a lower corner edge of said piece of formwork in said second angled bracket;
a second tubular clamp body with a second bar receiving passage and a second threaded passage, said bar being slidable engaged through said second bar receiving passage; and
a second screw removable engaged through said second threaded passage, wherein said first movable mode corresponds to said bar through said first bar receiving passage without contact by said first screw within said first bar receiving passage, wherein said second movable mode corresponds to said bar through said second bar receiving passage without contact by said second screw within said second bar receiving passage, wherein said first immovable mode corresponds to said bar through said first bar receiving passage with fixed contact by said first screw within said first bar receiving passage, and wherein said second immovable mode corresponds to said bar through said second bar receiving passage with fixed contact by said second screw within said second bar receiving passage so as to apply a clamping force along said bar by said first screw and said second screw; and a prop being coupled to the bar,
wherein said prop comprises:
a distal joint attached to said prop; and
a distal spike pivotably mounted to said distal joint.

5. The device, according to claim 4, wherein said prop further comprises a releasable prop clamp, said prop having an adjustable length.

6. A device for clamping a piece of formwork, the device comprising:
a bar having an end with a spike for attachment to a ground;
a first jaw being mounted on said bar and movable along said bar and having a first movable mode and a first immovable mode,
wherein said first jaw comprises:
a first angled bracket;
a first tubular clamp body with a first bar receiving passage and a first threaded passage, said bar being slidable engaged through said first bar receiving passage; and
a first screw removable engaged through said first threaded passage;
a second jaw being mounted on said bar and movable along said bar and having a second movable mode and a second immovable mode,
wherein said second jaw comprises:
a second angled bracket facing said first angled bracket so as to set an upper corner edge of said piece of formwork in said first angled bracket and a lower corner edge of said piece of formwork in said second angled bracket;
a second tubular clamp body with a second bar receiving passage and a second threaded passage, said bar being slidable engaged through said second bar receiving passage; and
a second screw removable engaged through said second threaded passage, wherein said first movable mode corresponds to said bar through said first bar receiving passage without contact by said first screw within said first bar receiving passage, wherein said second movable mode corresponds to said bar through said second bar receiving passage without contact by said second screw within said second bar receiving passage, wherein said first immovable mode corresponds to said bar through said first bar receiving passage with fixed contact by said first screw within said first bar receiving passage, and wherein said second immovable mode corresponds to said bar through said second bar receiving passage with fixed contact by said second screw within said second bar receiving passage so as to apply a clamping force along said bar by said first screw and said second screw; and a moulding element clamp mounted on a first flange away from a second flange so as to set a moulding element above an upper corner edge of said piece of framework.

* * * * *